(12) United States Patent
Reichelt

(10) Patent No.: US 9,049,482 B2
(45) Date of Patent: Jun. 2, 2015

(54) SYSTEM AND METHOD FOR COMBINING COMPUTER-BASED EDUCATIONAL CONTENT RECORDING AND VIDEO-BASED EDUCATIONAL CONTENT RECORDING

(75) Inventor: Katlyn Ann Reichelt, Berkeley, CA (US)

(73) Assignee: Udacity, Inc., Palo Alto, CA (US)

( * ) Notice: Subject to any disclaimer, the term of this patent is extended or adjusted under 35 U.S.C. 154(b) by 130 days.

(21) Appl. No.: 13/400,080

(22) Filed: Feb. 19, 2012

(65) Prior Publication Data

US 2013/0215292 A1 Aug. 22, 2013

(51) Int. Cl.

| | |
|---|---|
| *H04N 5/225* | (2006.01) |
| *H04N 5/262* | (2006.01) |
| *H04N 21/44* | (2011.01) |
| *G06T 11/00* | (2006.01) |
| *G09B 5/06* | (2006.01) |
| *H04N 5/77* | (2006.01) |
| *G06T 19/00* | (2011.01) |
| *G11B 27/034* | (2006.01) |
| *G11B 27/10* | (2006.01) |
| *H04N 21/234* | (2011.01) |
| *H04N 21/43* | (2011.01) |
| *H04N 21/431* | (2011.01) |
| *H04N 21/81* | (2011.01) |
| *H04N 9/806* | (2006.01) |
| *H04N 9/82* | (2006.01) |
| *H04N 21/41* | (2011.01) |
| *H04N 21/4223* | (2011.01) |

(52) U.S. Cl.
CPC .......... *H04N 21/44008* (2013.01); *G06T 11/00* (2013.01); *G09B 5/06* (2013.01); *H04N 5/772* (2013.01); *H04N 9/8063* (2013.01); *H04N 9/8227* (2013.01); *G06T 19/006* (2013.01); *G11B 27/034* (2013.01); *G11B 27/10* (2013.01); *H04N 21/23412* (2013.01); *H04N 21/4126* (2013.01); *H04N 21/4223* (2013.01); *H04N 21/4307* (2013.01); *H04N 21/431* (2013.01); *H04N 21/8146* (2013.01)

(58) Field of Classification Search
USPC ............... 348/14.03, 207.1, 207.11; 715/791, 715/204; 434/365
See application file for complete search history.

(56) References Cited

U.S. PATENT DOCUMENTS

| | | | |
|---|---|---|---|
| 2001/0050755 A1* | 12/2001 | Bogomolnyi | 353/15 |
| 2004/0075820 A1* | 4/2004 | Chu et al. | 353/122 |
| 2004/0125133 A1 | 7/2004 | Pea et al. | |
| 2005/0213849 A1* | 9/2005 | Kreang-Arekul et al. | 382/284 |
| 2008/0184124 A1* | 7/2008 | Agarwal et al. | 715/733 |

(Continued)

FOREIGN PATENT DOCUMENTS

WO  WO-2013/123499 A1  8/2013

OTHER PUBLICATIONS

Adobe Premiere Elelments Release 8, User's Manual, Last updated on Aug. 12, 2010, downloaded from—http://help.adobe.com/archive/en_US/premiereelements/8/premiereelements_8_help.pdf.*

(Continued)

*Primary Examiner* — Sinh Tran
*Assistant Examiner* — Shahbaz Nazrul
(74) *Attorney, Agent, or Firm* — Schwegman Lundberg & Woessner, P.A.

(57) ABSTRACT

An interactive learning tool that combines computer-based educational content recordings and video-based educational content recordings.

36 Claims, 30 Drawing Sheets

(56) References Cited

U.S. PATENT DOCUMENTS

2009/0132371 A1    5/2009   Strietzel et al.
2010/0296699 A1   11/2010   Pupilli et al.

OTHER PUBLICATIONS

"International Application Serial No. PCT/US2013/026679, International Search Report mailed Apr. 24, 2013", 2 pgs.

"International Application Serial No. PCT/US2013/026679, Written Opinion mailed Apr. 24, 2013", 6 pgs.

Loviscach, J., "A Real-Time Production Tool for Animated Hand Sketches", [online]. [retrieved on Mar. 21, 2013]. Retrieved from the Internet: <URL: http://www.cvmp-conference.org/dyn/1316429126318/CVMP11_A-real-time-production-tool-for-animated-hand-sketches.pdf>, (Nov. 17, 2011), 7 pgs.

* cited by examiner

```
1  p=[0.2, 0.2, 0.2, 0.2, 0.2]
2  world=['green', 'red', 'red', 'green', 'green']
3  Z = 'green'
4  pHit = 0.6
5  pMiss = 0.2
6
7  def sense(p, Z):
8      q=[]
9      for i in range(len(p)):
10         hit = (Z == world[i])
11         q.append(p[i] * (hit * pHit + (1-hit) * pMiss))
12     s = sum(q)
13     for i in range(len(p)):
```

```
Run
 1 p=[0.2, 0.2, 0.2, 0.2, 0.2]
 2 world=['green', 'red', 'red', 'green', 'green']
 3 Z = 'green'
 4 pHit = 0.6
 5 pMiss = 0.2
 6
 7 def sense(p, Z):
 8     q=[]
 9     for i in range(len(p)):
10         hit = (Z == world[i])
11         q.append(p[i] * (hit * pHit + (1-hit) * pMiss))
12     s = sum(q)
13     for i in range(len(p)):
```

```
Run
1  p=[0.2, 0.2, 0.2, 0.2, 0.2]
2  world=['green', 'red', 'red', 'green', 'green']
3  Z = 'green'
4  pHit = 0.6
5  pMiss = 0.2
6
7  def sense(p, Z):
8      q=[]
9      for i in range(len(p)):
10         hit = (Z == world[i])
11         q.append(p[i] * (hit * pHit + (1-hit) * pMiss))
12     s = sum(q)
13     
[0.11111111111... 0.3333333332,
 0.11111111111...
```

Video Creation Process

SYSTEM AND METHOD FOR COMBINING COMPUTER-BASED EDUCATIONAL CONTENT RECORDING AND VIDEO-BASED EDUCATIONAL CONTENT RECORDING

TECHNICAL FIELD

This patent document pertains generally to interactive learning tools and online education systems, and more particularly, but not by way of limitation, to an interactive learning tool that combines computer-based educational content recordings and video-based educational content recordings.

BACKGROUND

In the current information age, online educational content (such as online lectures) are becoming an increasingly important tool for educators and academic institutions seeking to provide classes and lectures to remote users around the world.

Conventionally, when a remote user desires to access online educational content, such as online lectures offered by a university or other organization, the user typically utilizes a web browser of a computer terminal, mobile device or similar apparatus to connect to a network (e.g. the Internet) and access the relevant website of the university or other organization. The content of the education website often includes video recordings of lecturers, professors and other instructors conducting a class and writing or drawing on a writing surface (e.g. a sheet of paper, a blackboard, a whiteboard, etc).

However, there exists a drawback in that, in such video recordings of the instructor conducting a class, it is often extremely difficult to see the material being written or drawn by the instructor, since physical objects (e.g. the instructor's body or hand, or the instructor's writing instrument) may obstruct the video camera's view of the material being written or drawn by the instructor on the writing surface.

Moreover, the content of an education website may also include screen capture videos of information output from a computing device operated by the instructor. However, such screen capture videos often seem impersonal, since they cannot incorporate or represent the personal presence of the instructor. Instead, the screen capture videos are limited to duplicating the display screen output of the instructor's computer, and thus severely limiting the ability of the instructor to communicate with the remote users.

There exists a need for an improved system for providing online educational content to remote users, in a manner that more effectively replicates the physical experience of attending a class or lecture in person.

SUMMARY

In an aspect of this disclosure, a mobile device generates a screen capture video, based on display output being output from a display screen of the mobile device; a video camera module generates an audio-visual recording of the display screen and of one or more physical objects positioned between the video camera and the display screen; and a composite lecture video is generated, based on the screen capture video and the audio visual recording.

In another aspect, the composite lecture video includes graphical markings from the screen capture video visually overlapping the physical objects recorded in the audio-visual recording.

In another aspect, the one or more physical objects include a stylus.

In another aspect, the composite lecture video is generated by superimposing the screen capture video over the audio-visual recording.

In another aspect, a composite lecture video generator: processes the screen capture video to increase a transparency of the screen capture video, and superimposes the processed screen capture video over the audio-visual recording to generate the composite lecture video.

In another aspect, the composite video lecture generator synchronizes a timing and an orientation of the screen capture video with a timing and orientation of the audio-visual recording, by comparing graphical markings of the screen capture video with graphical markings of the audio-visual recording.

In another aspect, the composite video lecture generator generates the composite lecture video, by superimposing the synchronized screen capture video over the synchronized audio-visual recording.

BRIEF DESCRIPTION OF DRAWINGS

Some embodiments are illustrated by way of example and not limitation in the figures of the accompanying drawings in which:

FIG. 5a illustrates an example of an audio-visual recording generated by a video camera, according to an exemplary embodiment.

FIG. 5b illustrates an example of a screen capture video, based on display output being output from a display screen of a mobile device, according to an exemplary embodiment.

FIG. 5c illustrates an example of a screen capture video being superimposed over an audio-visual recording, according to an exemplary embodiment.

FIG. 5d illustrates an example of a composite lecture video generated based on a screen capture video and an audio visual recording, according to an exemplary embodiment.

FIG. 6a illustrates an example of an audio-visual recording generated by a video camera, according to an exemplary embodiment.

DETAILED DESCRIPTION

Figure 1:
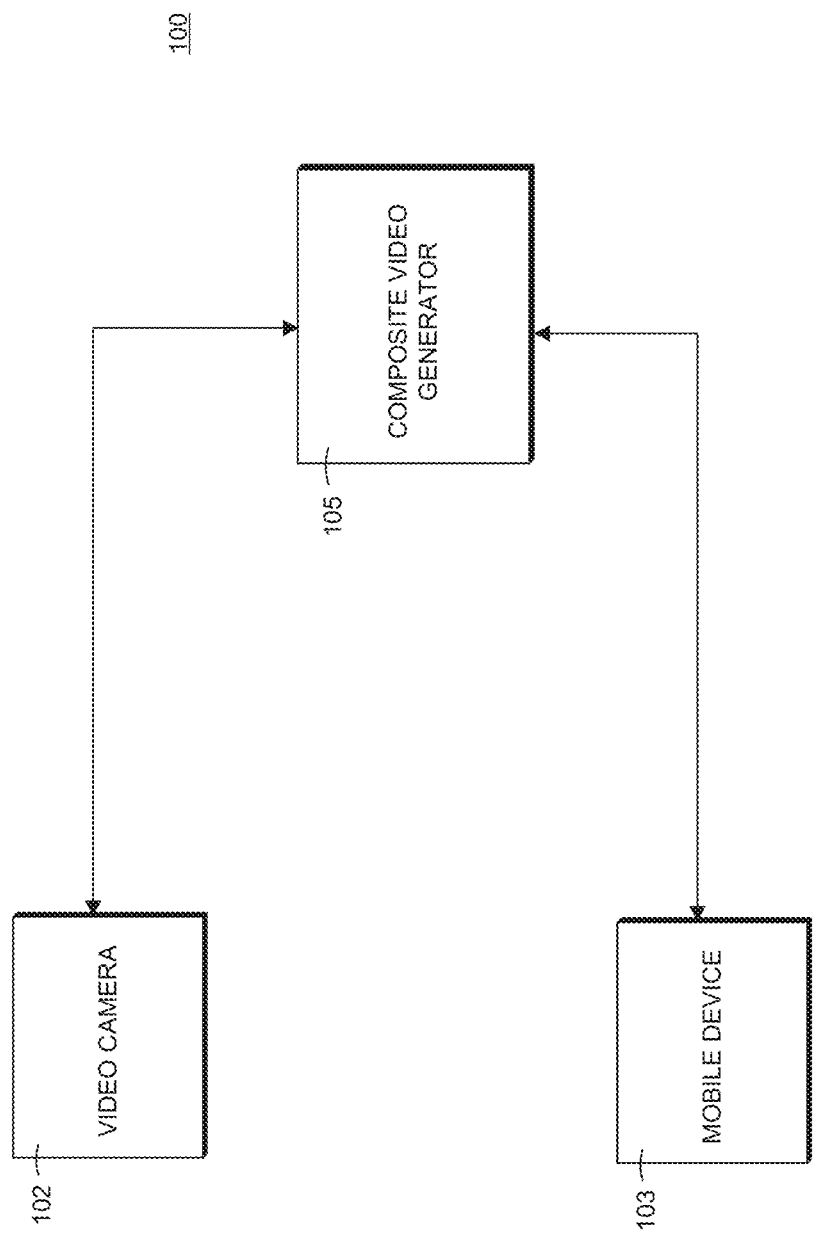
FIG. 1 is a block diagram illustrating a system for combining computer-based educational content recordings and video-based educational content recordings, according to example embodiment.

In the following description, for purposes of explanation, numerous specific details are set forth in order to provide a thorough understanding of some example embodiments. It will be evident, however, to one skilled in the art that the present invention may be practiced without these specific details.

Referring now to the drawings, wherein like reference numerals designate identical or corresponding parts throughout the several views, there is described tools (systems, apparatuses, methodologies, computer program products, etc.) for improved system for navigating content, such as the content of a website which may be accessed over a network such as the Internet.

For example, FIG. 1 shows schematically a system 100 for combining computer-based educational content recordings and video-based educational content recordings. The system 100 includes a video camera 102, mobile device 103 and composite video generator 105, the aspects of which will be described in more detail herein.

Figure 2:
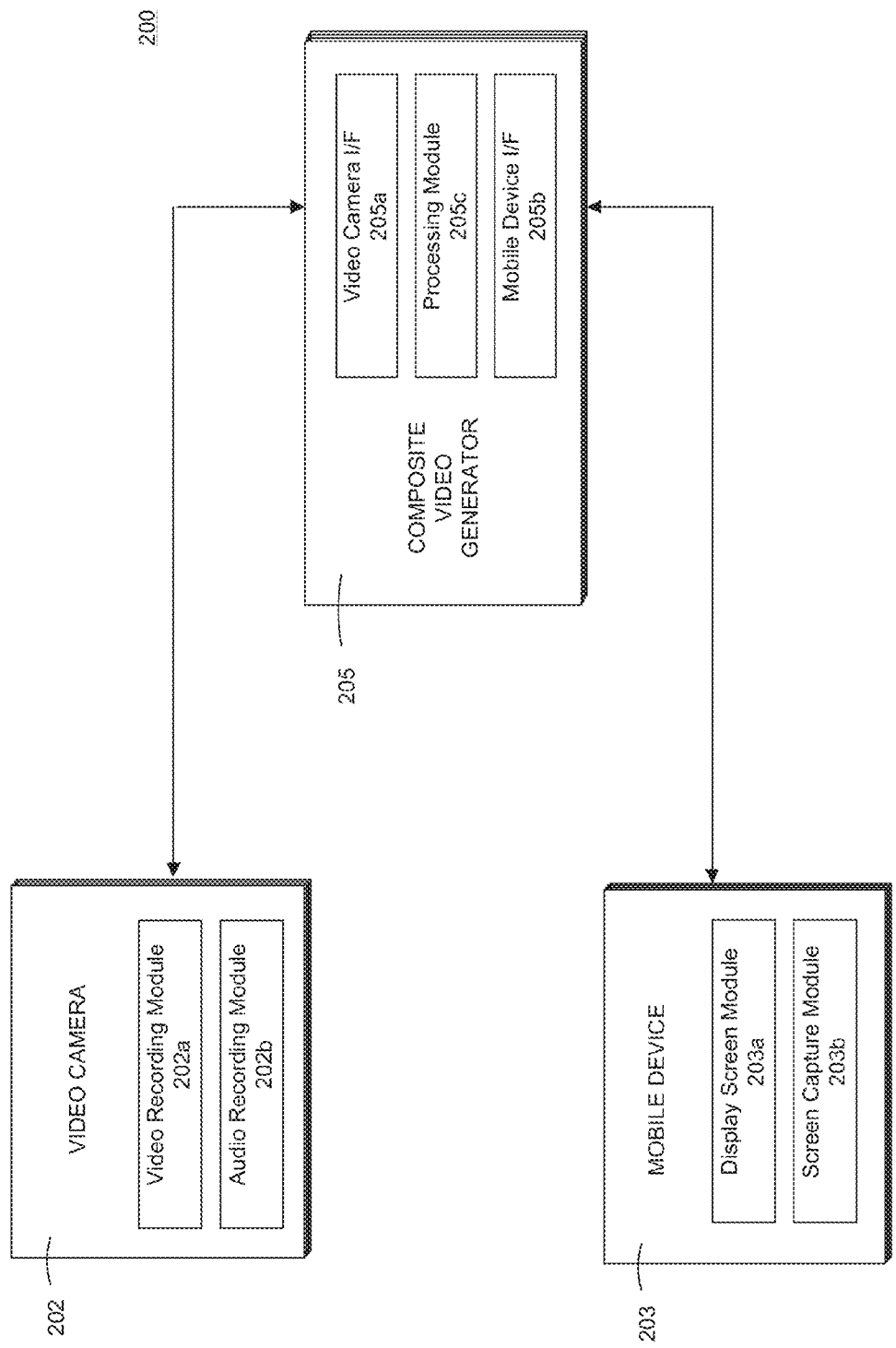
FIG. 2 is a block diagram illustrating a system for combining computer-based educational content recordings and video-based educational content recordings, according to another example embodiment.

FIG. 2 shows a more detailed schematic of a system 200, wherein system 200 is a more detailed example of the system 100. The system 200 includes a video camera 202 (which may be substantially similar to video camera 102), mobile device 203 (which may be substantially similar to mobile device 103), and composite video generator 205 (which may be substantially similar to composite video generator 105). Video camera 202 includes video recording module 202a and audio recording module 202b. Mobile device 203 may include display screen module 203a and screen capture module 203b. Composite video generator 205 may include video camera interface ("I/F") 205a, mobile device I/F 205b, and processing module 205c.

In brief, a user of the mobile device 103 or 203 (such as a professor, lecturer or instructor) may utilize the mobile device in order to conduct an educational class or lecture. For example, the instructor may access applications, files, media, etc. stored on the mobile device, and may use a pen, stylus pen, a finger, etc. to point to various items being displayed on the display screen of the mobile device (such as display screen module 203a of mobile device 203). Instead or in addition, the mobile device 103 or 203 may be a tablet computing device, and the instructor may utilize a stylus pen in order to write or draw on a touch-sensitive display screen of the tablet computing device (such as display screen module 203a of mobile device 203), wherein the touch-sensitive display screen of the tablet computing device recognizes the touch of the stylus pen, and renders and visually displays lines, markings, writing, drawings, etc., based on the movement of the stylus pen on the display screen of the tablet computing device.

The mobile device 103 or 203 is operable to generate a screen capture video, based on display output being output from a display screen of the mobile device (such as (a) the aforementioned applications, files, media, etc. stored on the mobile device that are being access and displayed on the display screen of the mobile device, and (b) the aforementioned lines, markings, writing, drawings, etc., displayed on a touch-sensitive display screen of a tablet computing device, based on the movement of the stylus pen on the display screen of the tablet computing device). That is, such a screen capture video will only include information being displayed on the display screen of the mobile device. The screen capture video may be generated by, for example, the screen capture module 203b of the mobile device 203, which may include hardware and/or software (such as screen capture software like Screenflick, produced by the Araelium Group).

The mobile device 102 or 202 may be any network-connected device including but not limited to a tablet computing device, a personal, notebook or workstation computer, a terminal, a kiosk, a PDA (personal digital assistant), a smartphone, a scanner, a printer, a plotter, a facsimile machine, a multi-function device (MFD), a server, a mobile phone or handset, another information terminal, etc. The mobile device may be configured with software allowing the device to communicate through networks with other devices. Although the systems 100 and 200 include a mobile device, the device 103 may also be a stationary workstation, desktop or computer terminal.

The video camera 102 or 202 is specifically positioned to face the displayed screen of the mobile device 103 or 203, and is operable to generate an audio-visual recording of the display screen. Since the video camera is external (i.e. positioned outside) the mobile device, but directly faces the screen of the mobile device, the video camera can generate an audio-visual recording of not only the displayed screen of the mobile device, but also of any physical objects that happen to be positioned between the video camera and the display screen. Such objects may include, for example, the body of an individual (e.g. a lecturer or instructor), or the instructor's hands, the instructor's pen, the instructor's stylus instrument's and so forth. The video camera (e.g. video camera 202 in FIG. 2) may include a video recording module 202a to record visual image to generate the audio-visual recording, and an audio recording module 202b to record audio to generate the audio-visual recording.

The composite video generator 105 or 205 is operable to generate a composite lecture video, based on elements of the screen capture video and elements of the audio visual recording. For example, the video camera I/F 205a of the composite video generator 205 may receive the audio-visual recording from the video camera 202, and provide it to the processing module 205c. Similarly, the mobile device I/F 205b of the composite video generator 205 may receive the screen capture video from the mobile device 203, and provide it to the processing module 205c. The processing module 205c of the composite video generator 205 can then select specific elements of the screen capture video and the audio-visual recording, and combine such elements in a particular manner and into a particular 'mixture', in order to generate a composite lecture video that includes characteristics of the screen capture video and characteristics of the audio-visual recording, as will be described in more detail herein.

According to an exemplary embodiment, the composite lecture video includes graphical markings from the screen capture video visually overlapping the physical objects recorded in the audio-visual recording.

For example, if an instructor accesses applications, files, media, etc. stored on the mobile device 103 or 203, the instructor may use a pen, stylus pen, a finger, etc. to point to various items being displayed on the display screen of the mobile device 301. In such case, the audio-visual recording of the display screen of the mobile device (recorded from the video camera 102 or 202) will depict the information being displayed on the display screen as being positioned under the instructor's hand, finger, pen, stylus, etc., since such objects are interposed between the lens of the video camera and the display screen of the mobile device. However, the composite video generator of this disclosure may superimpose elements of the screen capture video over elements of the audio-visual recording (such as the instructor's hand, finger, pen, stylus, etc.). Thus, in the composite video, what the instructor is writing appears to visually overlap the instructor's hand, finger, pen, stylus, etc. This is particularly useful for left-handed professors who would otherwise cover the text with their hand.

Similarly, if the mobile device 103 is a tablet computing device, the instructor may utilize a stylus pen in order to write or draw on a touch-sensitive display screen of the tablet computing device, wherein the touch-sensitive display screen of the tablet computing device recognizes the touch of the stylus pen, and renders and visually displays lines, markings, writing, drawings, etc., based on the movement of the stylus pen on the display screen of the tablet computing device. In such case, the audio-visual recording of the display screen of the mobile device (recorded from the video camera 102 or 202) will depict the information being displayed on the display screen as being positioned under the instructor's hand, finger, pen, stylus, etc., since such objects are interposed between the lens of the video camera and the display screen of the mobile device. However, the composite video generator of this disclosure may superimpose elements of the screen capture video over elements of the audio-visual recording (such as the instructor's hand, finger, pen, stylus, etc.). Thus, in the composite video, what the instructor is writing appears to visually overlap the instructor's hand, finger, pen, stylus, etc. This is particularly useful for left-handed professors who would otherwise cover the text with their hand.

Figure 3:
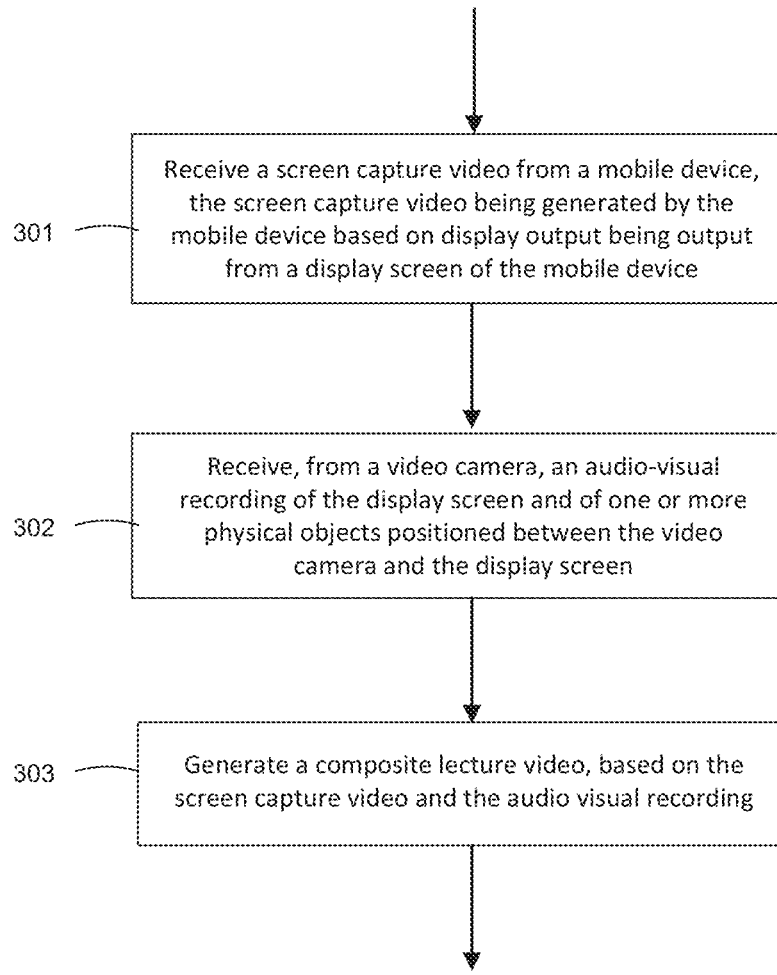
FIG. 3 is a flow chart illustrating a method of generating a composite lecture video, according to an example embodiment.

FIG. 3 is a flow chart illustrating a method of generating a composite video performed by composite video generator, such as composite video generator 105 or 205, in accordance with an example embodiment. The method may be performed by any of the modules, logic, or components described herein.

In S301, the composite video generator receives a screen capture video from a mobile device, the screen capture video being generated by the mobile device based on display output being output from a display screen of the mobile device. In S302, the composite video generator receives, from a video camera, an audio-visual recording of the display screen and of one or more physical objects positioned between the video camera and the display screen. In S303, the composite video generator generates a composite lecture video, based on the screen capture video and the audio visual recording.

Figure 4A:
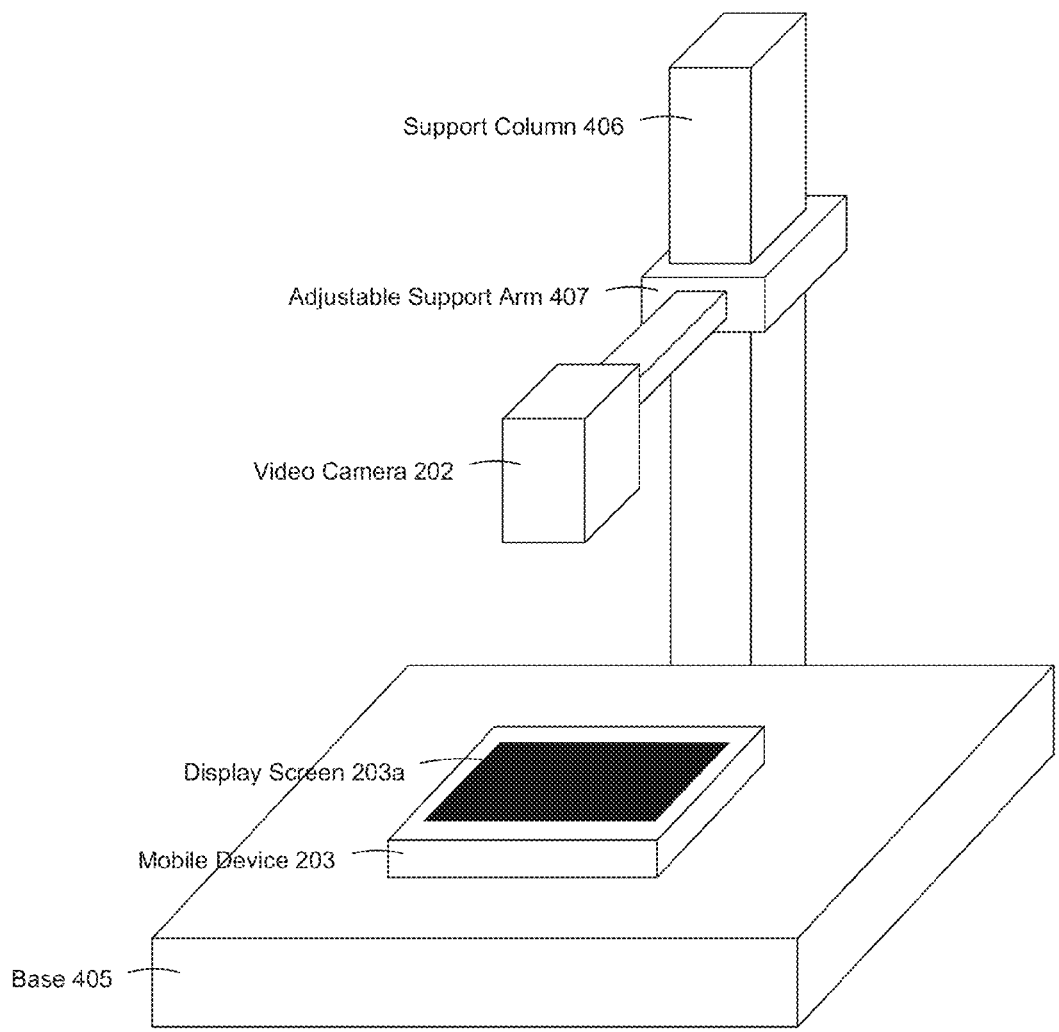
FIGS. 4a and 4b and 4c are schematic diagrams illustrating a system for combining computer-based educational content recordings and video-based educational content recordings, according to another example embodiment.
Figure 4B:
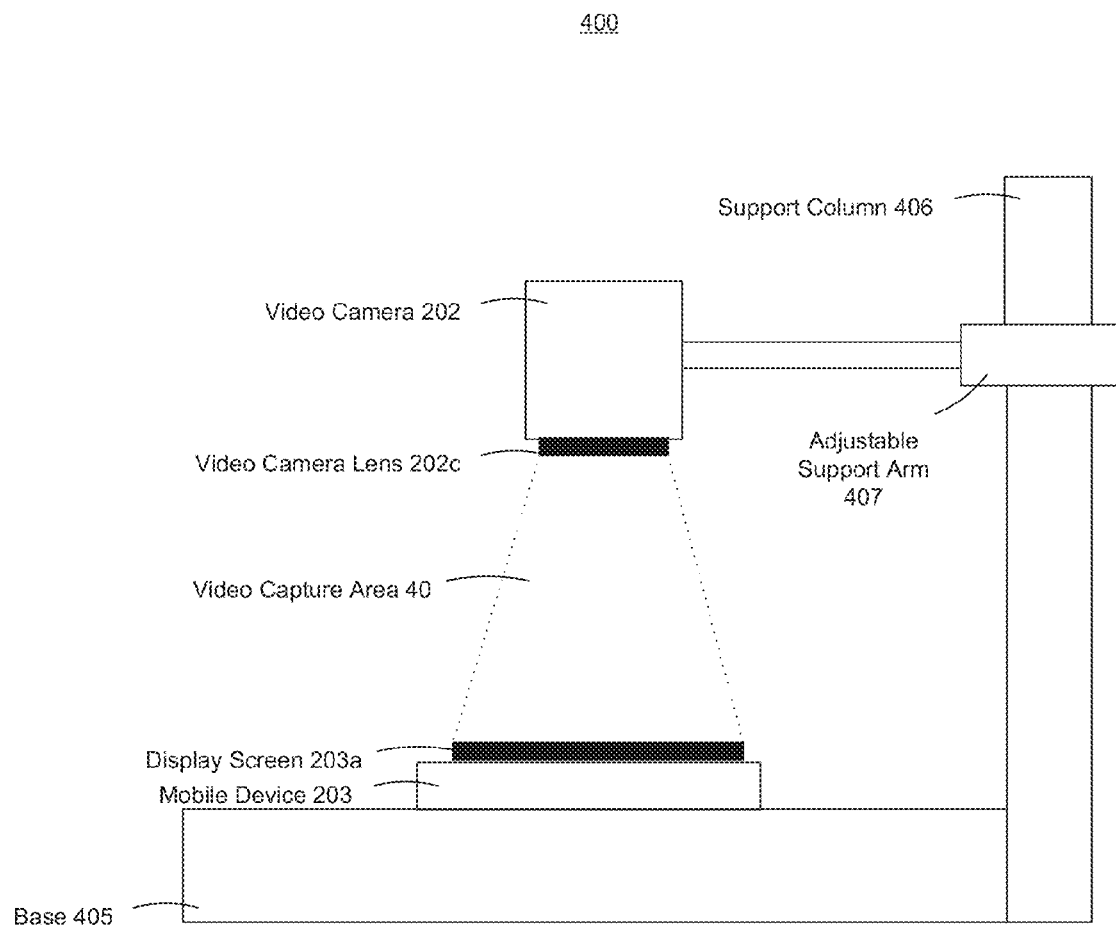

FIGS. 4A and 4B illustrate a physical arrangement 400 of various elements of the system of this disclosure, such as the video camera (102 or 202) and mobile device (103 or 203). In particular, FIG. 4A illustrates video camera 202 being specifically positioned to face the display screen 203a of mobile device 203. Video camera 202 may be held in the specific position by an adjustable 407 that is movable with respect to a support column 406 that is attached to a stationary base 405. The mobile device 203 is attached to the stationary base 405. FIG. 4b illustrates a side view of the system 400. As best seen in FIG. 4b, the video camera 202 is specifically positioned to face the display screen 203a of mobile device 203, such that the video camera lens 202c of the video camera 202 is parallel to the surface of the display screen 203a of the mobile device 203. In this way, the audio-visual recording generated by the video camera 202 includes the display screen 203a of the mobile device 203, and also captures everything in the video capture area 40, which includes any objects that happen to be positioned between the video camera and the display screen. Such objects may include, for example, the body of an individual (e.g. a lecturer or instructor), or the instructor's hands, the instructor's pen, the instructor's stylus instrument's and so forth.

Figure 6B:
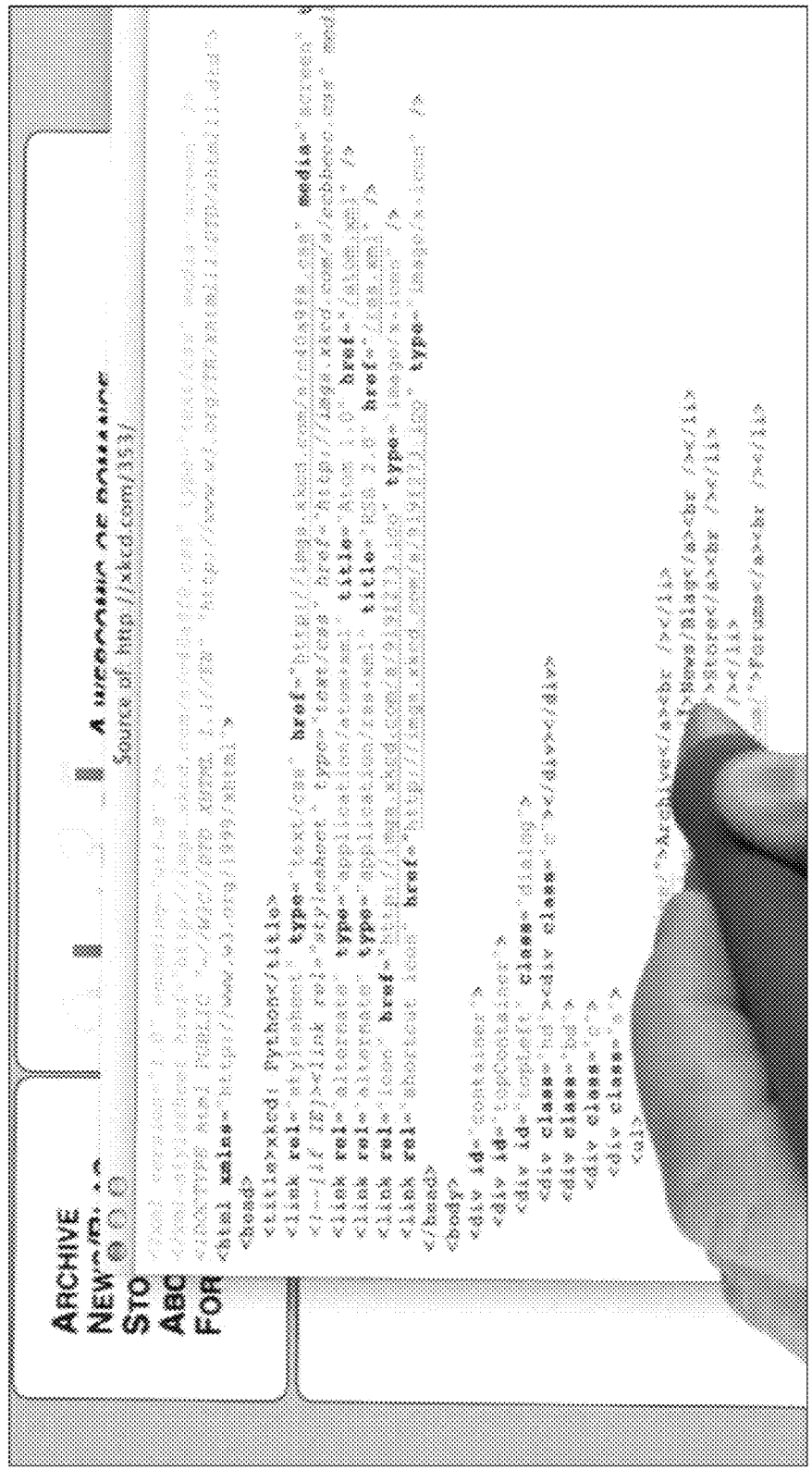
FIG. 6b illustrates an example of a screen capture video, based on display output being output from a display screen of a mobile device, according to an exemplary embodiment.
Figure 7A:
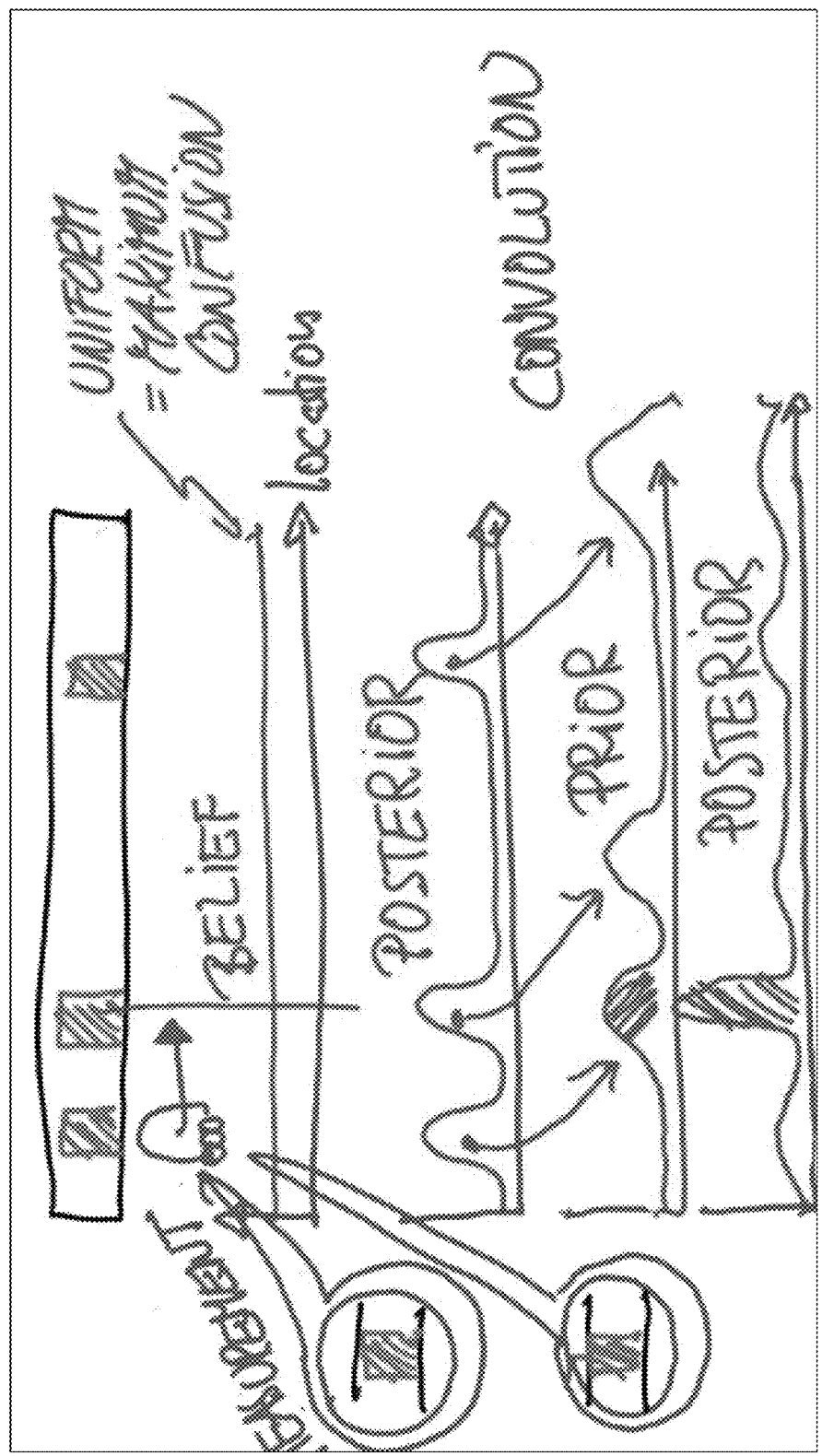
FIG. 7a illustrates an example of an audio-visual recording generated by a video camera, according to an exemplary embodiment.
Figure 7B:
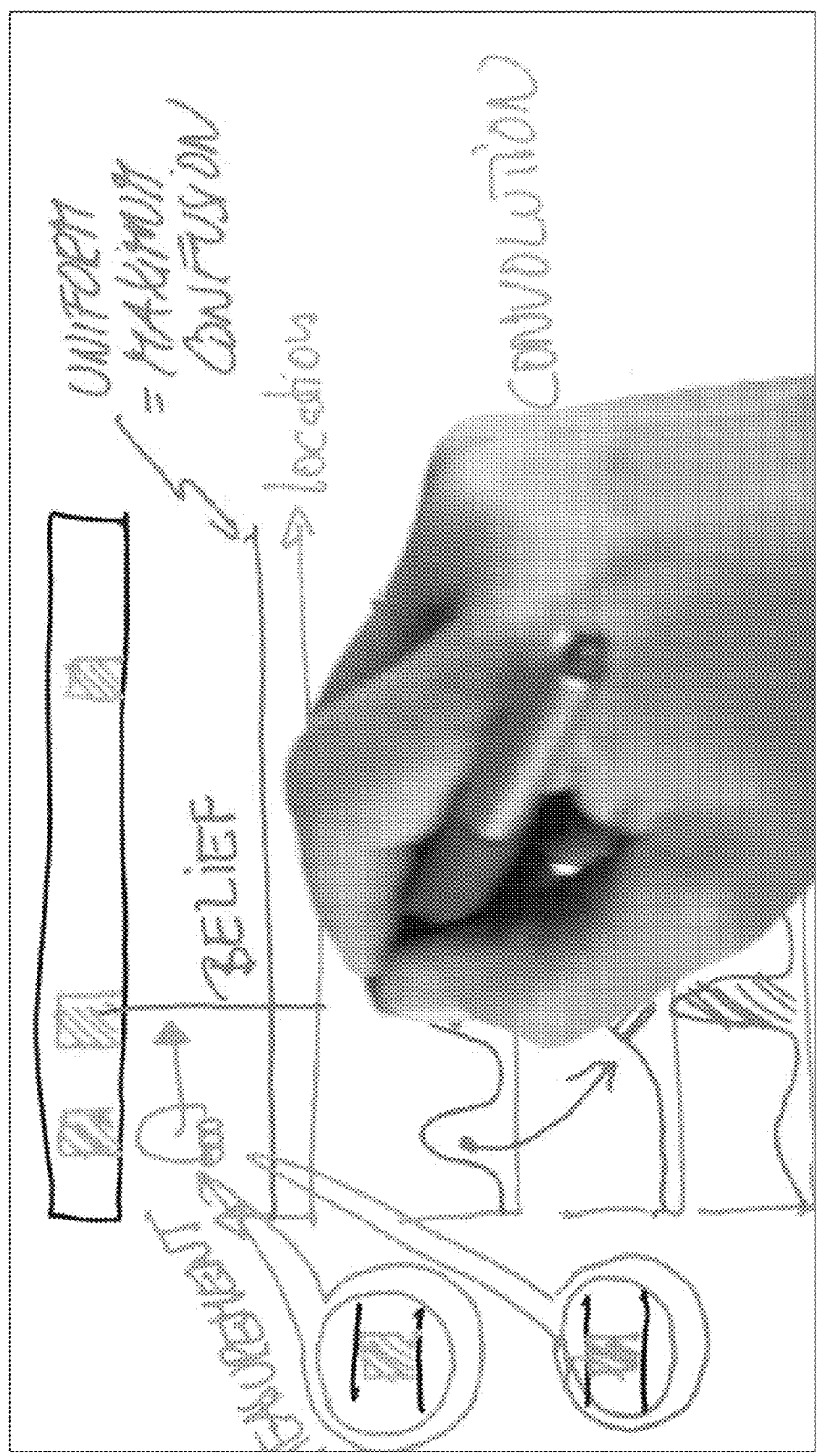
FIG. 7b illustrates an example of a screen capture video, based on display output being output from a display screen of a mobile device, according to an exemplary embodiment.
Figure 7C:
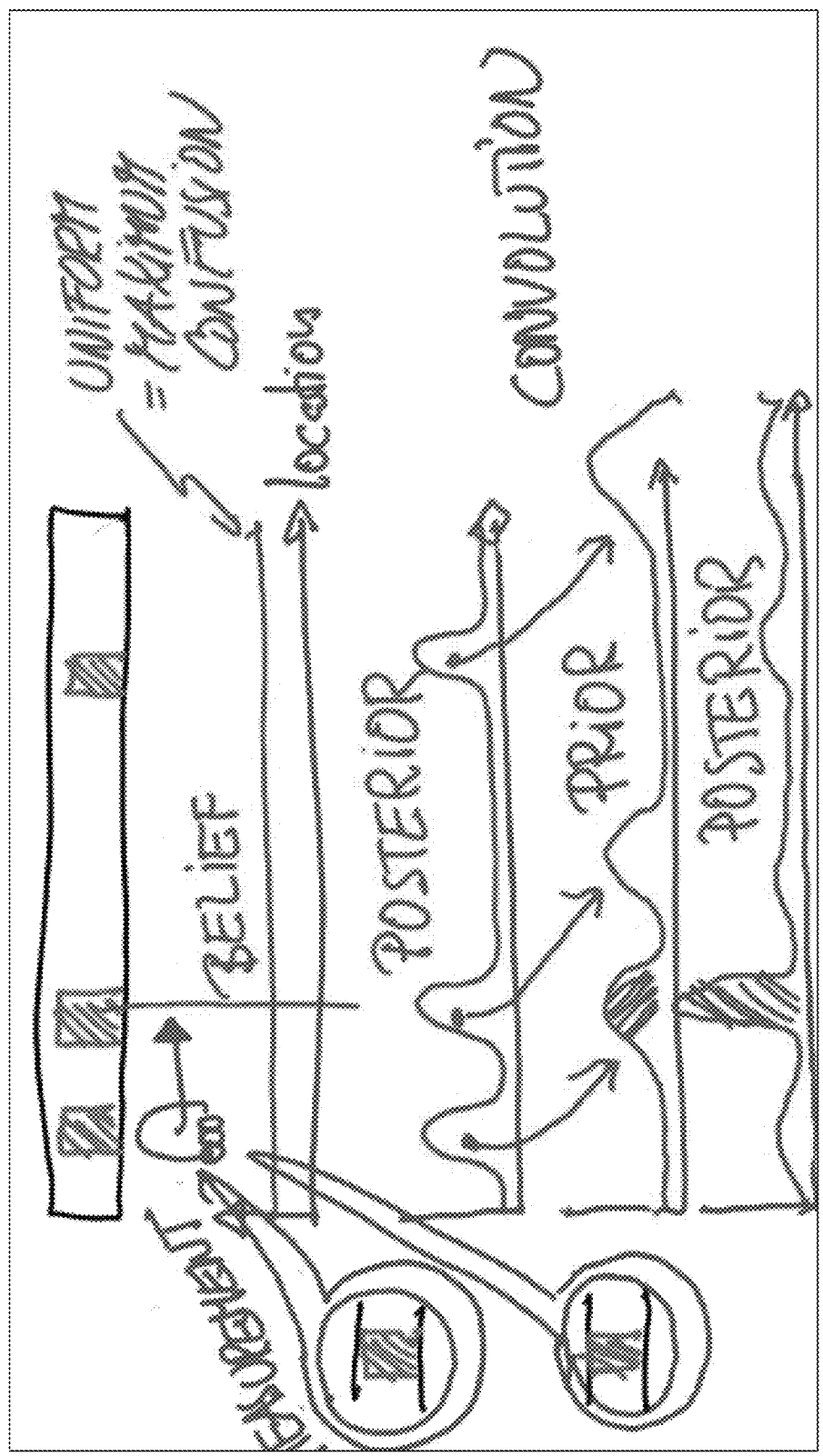
FIG. 7c illustrates an example of a screen capture video being superimposed over an audio-visual recording, according to an exemplary embodiment.
Figure 7D:
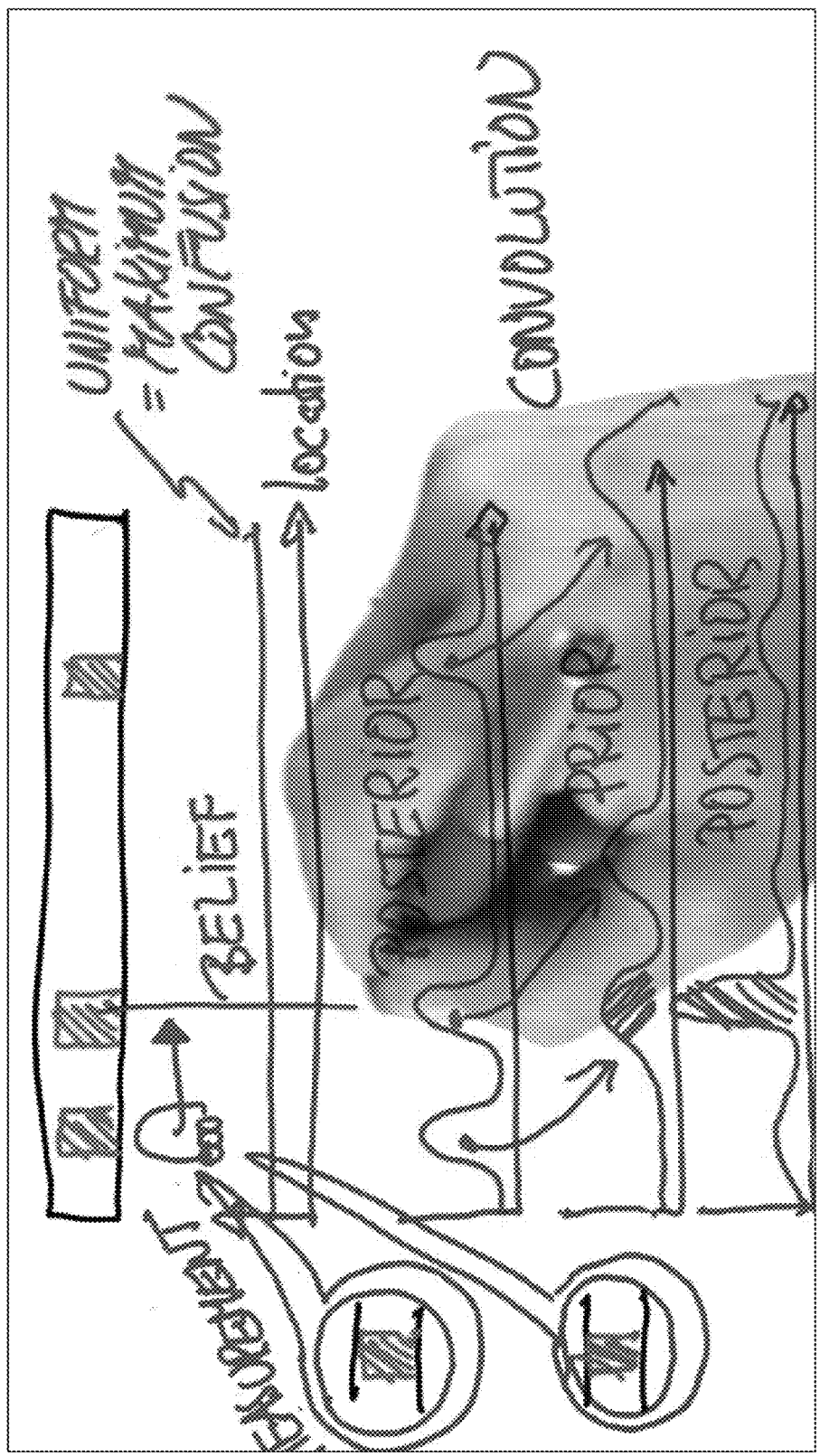
FIG. 7d illustrates an example of a composite lecture video generated based on a screen capture video and an audio visual recording, according to an exemplary embodiment.
Figure 8:
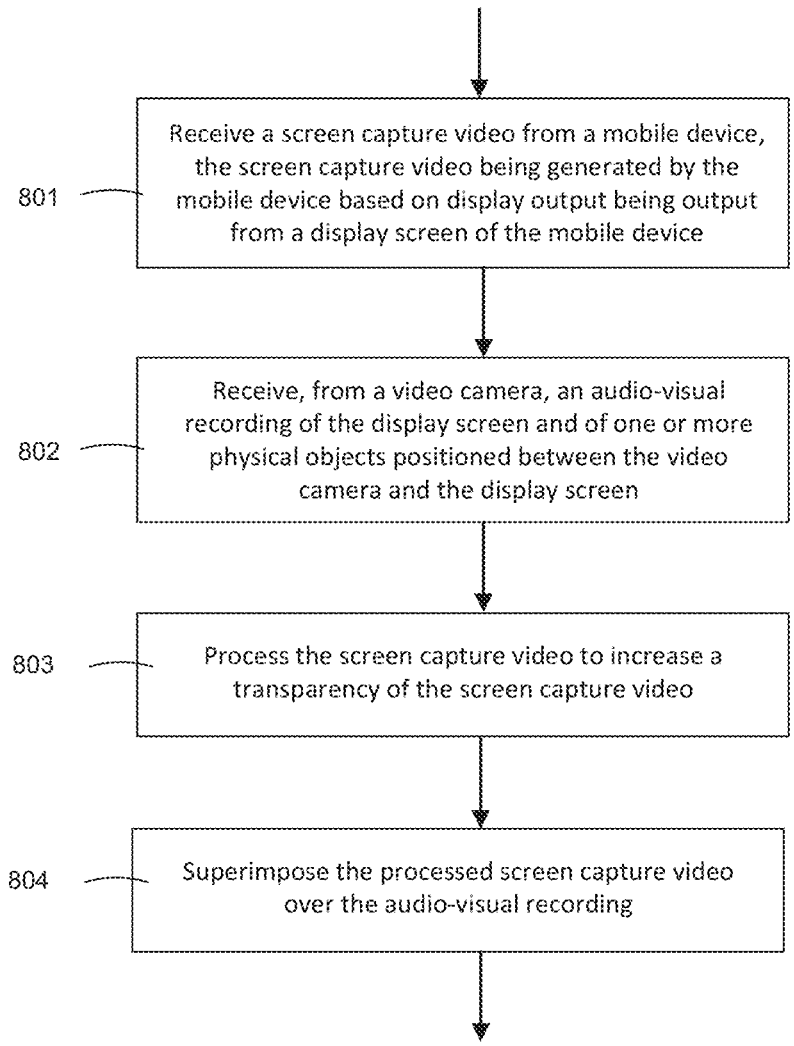
FIG. 8 is a flow chart illustrating a more detailed method of generating a composite lecture video, according to an example embodiment.

Turning now to FIGS. 5-8, aspects of the exemplary embodiments of this disclosure are described in more detail. In particular, FIG. 8 is a flow chart illustrating a method of generating a composite video performed by composite video generator, such as composite video generator 105 or 205, in accordance with an example embodiment. The method may be performed by any of the modules, logic, or components described herein.

Figure 5B:
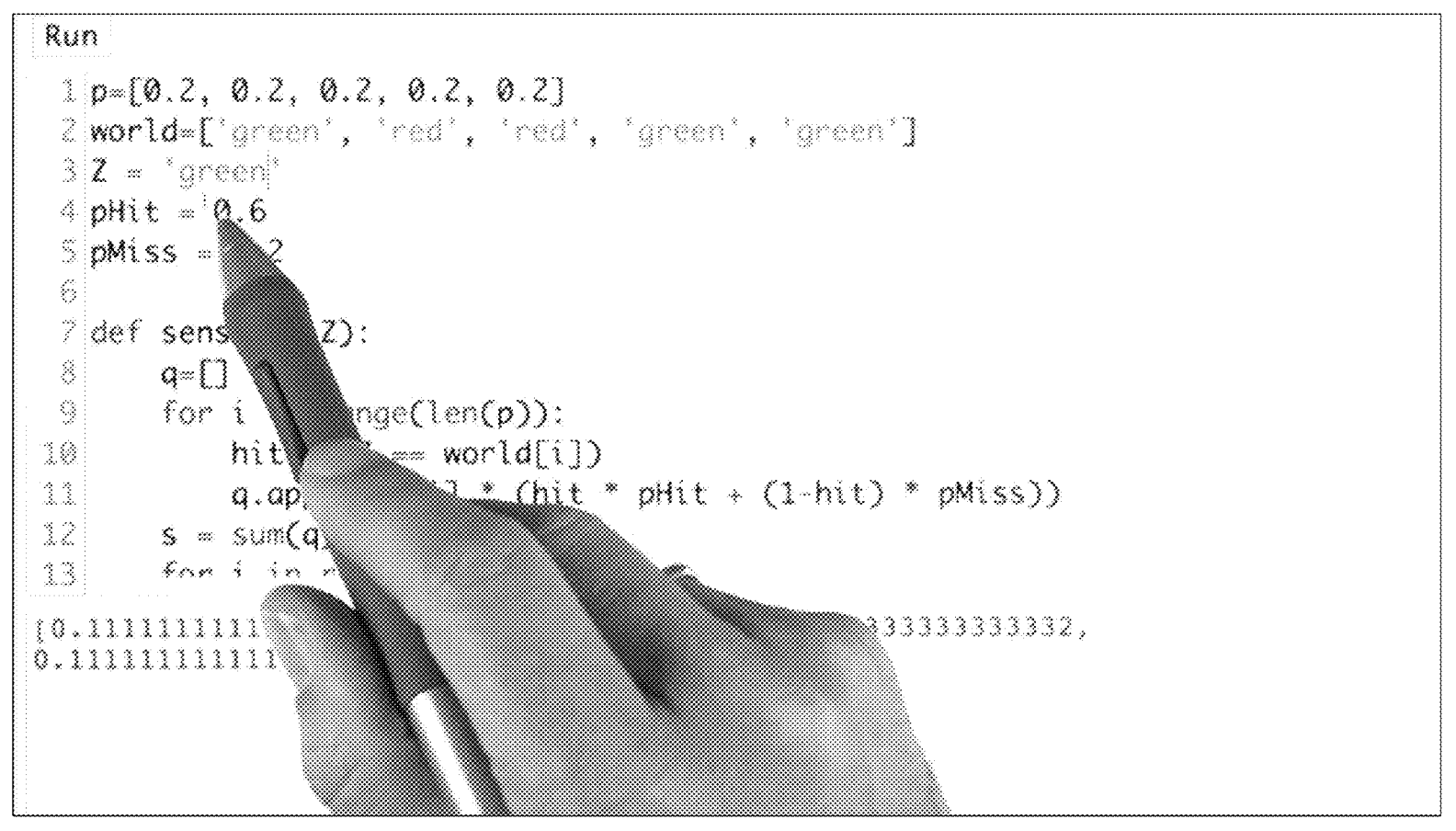

In S801, the composite video generator receives a screen capture video from a mobile device, the screen capture video being generated by the mobile device based on display output being output from a display screen of the mobile device. FIGS. 5a, 6a and 7a each illustrate an example of a screenshot of a screen capture video generated by a mobile device 102 or 202 (e.g. a tablet computing device).

In S802, the composite video generator receives, from a video camera, an audio-visual recording of the display screen and of one or more physical objects positioned between the video camera and the display screen. FIGS. 5b, 6b and 7b each illustrate an example of a screenshot of an audio-visual recording generated by a video camera.

Figure 6C:
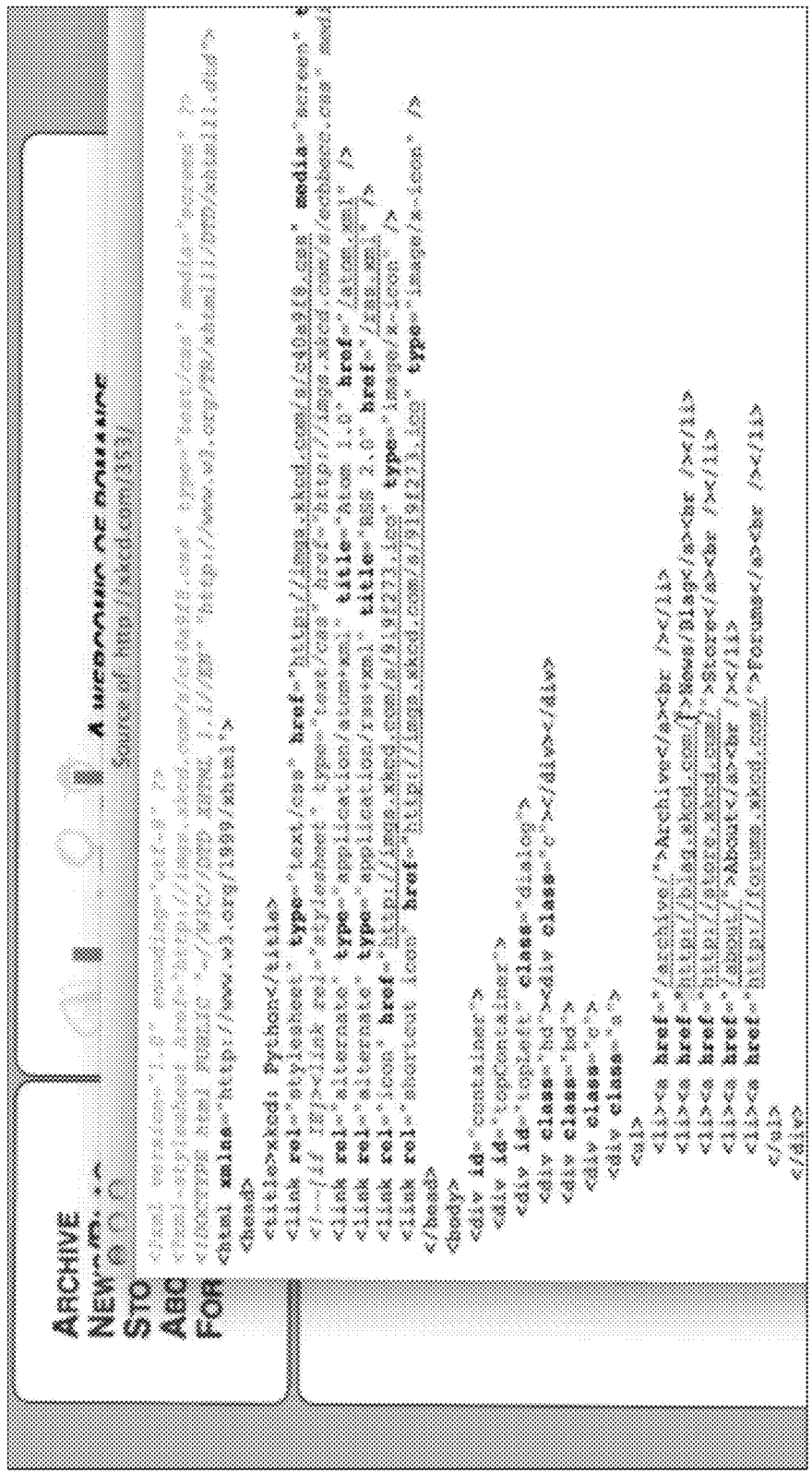
FIG. 6c illustrates an example of a screen capture video being superimposed over an audio-visual recording, according to an exemplary embodiment.

In S803, the composite video generator processes the screen capture video to increase a transparency of the screen capture video. For example, the composite video generator may apply a transparency or opacity filter (such as a multiple filter, available in Adobe Premiere) in order to increase the transparency or reduce the opacity of at least the white color (or lighter-color) portions of the screen capture video. FIGS. 5c, 6c and 7c each illustrate an example of a screenshot of a screen capture video that has been processed to increase a transparency of the screen capture video.

Figure 6D:
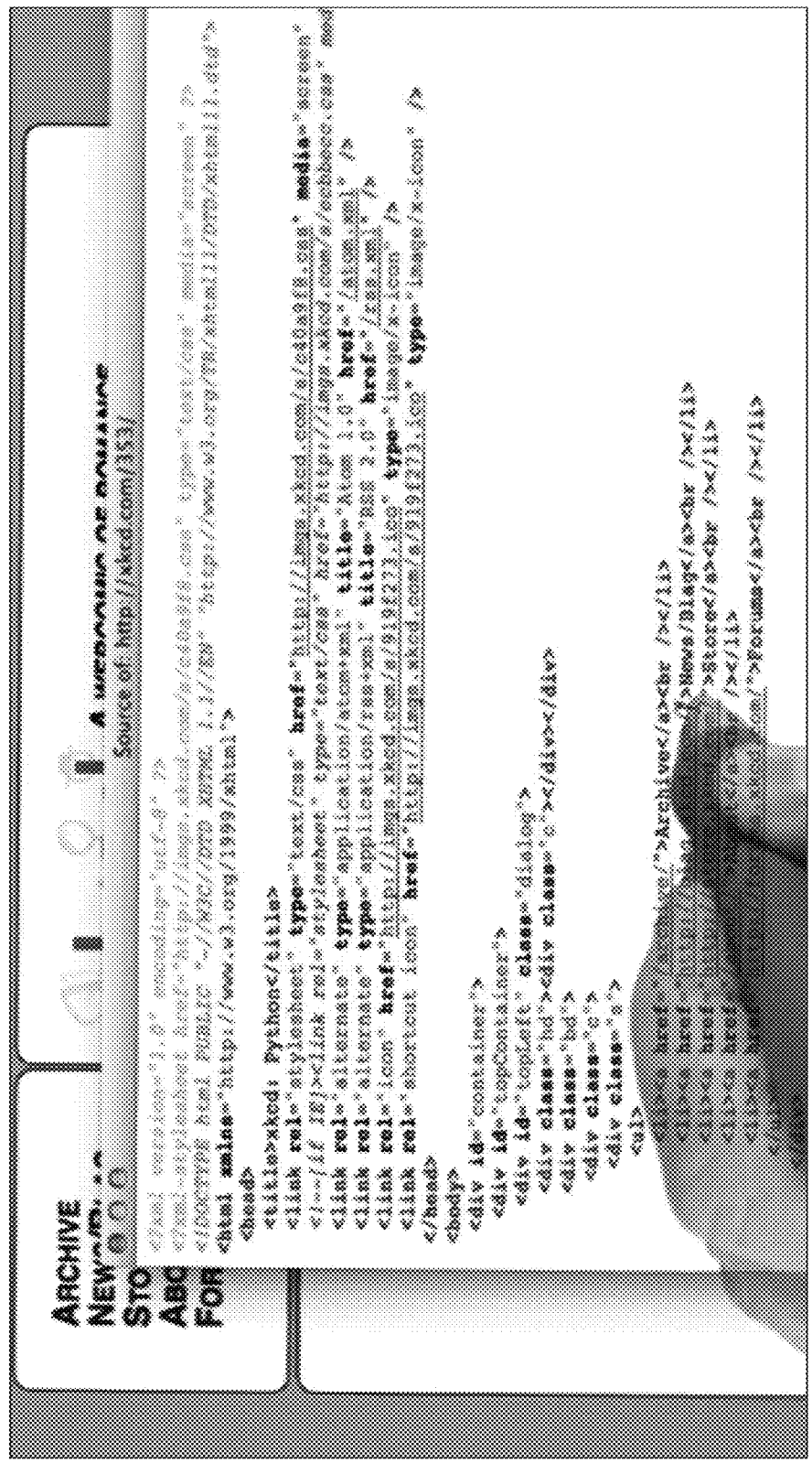
FIG. 6d illustrates an example of a composite lecture video generated based on a screen capture video and an audio visual recording, according to an exemplary embodiment.

Finally, in S804, the composite video generator superimposes the processed screen capture video over the audio-visual recording to generate the composite lecture video. That is, the composite video generator superimposes the screen capture—having reduced opacity or increased transparency in at least the white color (or lighter-color) portions of the screen capture video—over the audio-visual recording. The result is illustrated in FIGS. 5d, 6d, and 7d, which each illustrate an example of a screenshot of a composite video. As seen in FIGS. 5d, 6d, and 7d, since at least white color (or light-color) portions of the screen capture video have reduced opacity or increased transparency, the physical objects captured by the audio-visual recording (e.g. the instructor's body or hand, or the instructor's writing instrument) become visible, but still appear overlapped by (or "underneath") the darker markings of the screen capture video. Thus, in the composite video, what the instructor is writing appears to visually overlap the instructor's hand, finger, pen, stylus, etc. Thus, viewers of the composite video can both see what the instruction is writing or drawing, but also see the instructor's hand, pen, finger being pointed, etc.

The steps of the method of FIG. 8 may be reordered. For example, steps 801 and 802 are interchangeable. As another example, steps 803 and 804 are interchangeable; i.e. the screen capture video may be superimposed over the audio-visual recording, and then the opacity of the screen capture video may be reduced.

Note that the screen capture data described in this disclosure may include any output displayed by the mobile device (102 or 202), which may correspond to any file, application, media, etc. being accessed by the mobile device. Thus, the aspects of this disclosure apply to various media types, such as software coding environments to teach students software coding (see, e.g., FIG. 5), websites (see, e.g., FIG. 6) and multimedia such as music, videos and drawings (see, e.g., FIG. 7).

Although the composite video generated by the composite video generator may referred to here as a "composite lecture video" it should be understood that the various methodologies and aspects of the embodiments of this disclosure may be similarly applied to generate composite videos that may not necessarily be related to educational and/or learning endeavors.

According to another aspect, described below with reference to FIGS. 9 and 10, the composite video generator synchronizes a timing of the screen capture video with a timing of the audio-visual recording, by comparing graphical markings of the screen capture video with graphical markings of the audio-visual recording.

That is, after the composite video generator receives the audio-visual recording from the video camera and the screen capture video from the mobile device, and after the composite video generator processes the opacity of the screen capture video, the composite video generator attempts to superimpose the screen capture video over the audio-visual recording. However, since the two inputs are video streams, it is possible that they are not synchronized in time.

Figure 9A:
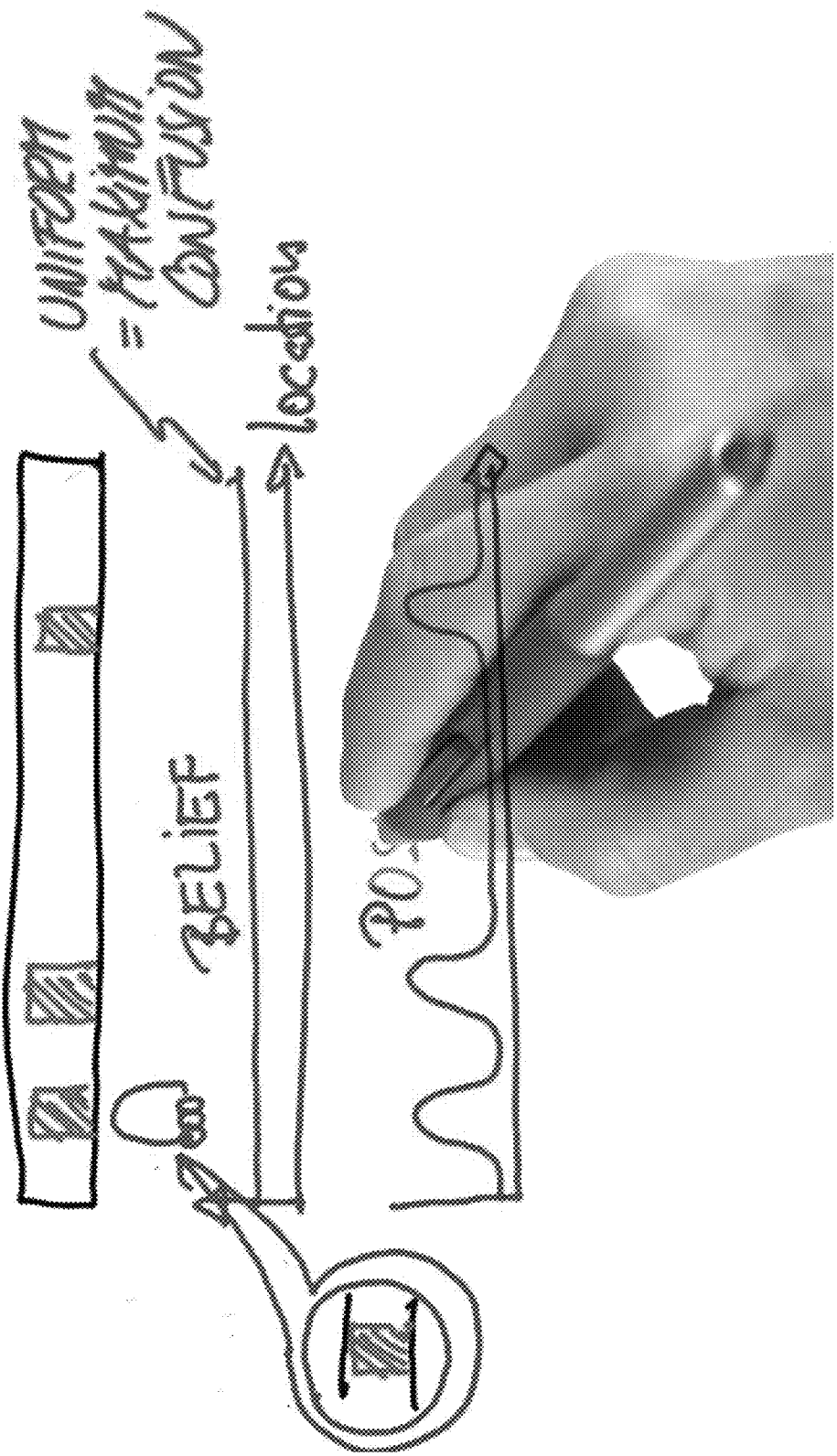
FIGS. 9A-9C illustrate a process of synchronizing a timing and an orientation of the screen capture video with a timing and orientation of the audio-visual recording, according to an example embodiment.

For example, the audio-visual recording may be "ahead of time" compared with the screen capture video, as illustrated in FIG. 9a. In FIG. 9a, the audio-visual recording shows a moment in time t1 where an instructor is writing the letter "s" on tablet touch-sensitive display screen, after the instructor has already written the letters "p" and "o", whereas the superimposed screen capture video shows a moment in time t0 wherein the display screen is in the process of displaying the letter "o", and the letter "s" has not yet been displayed.

Figure 9B:
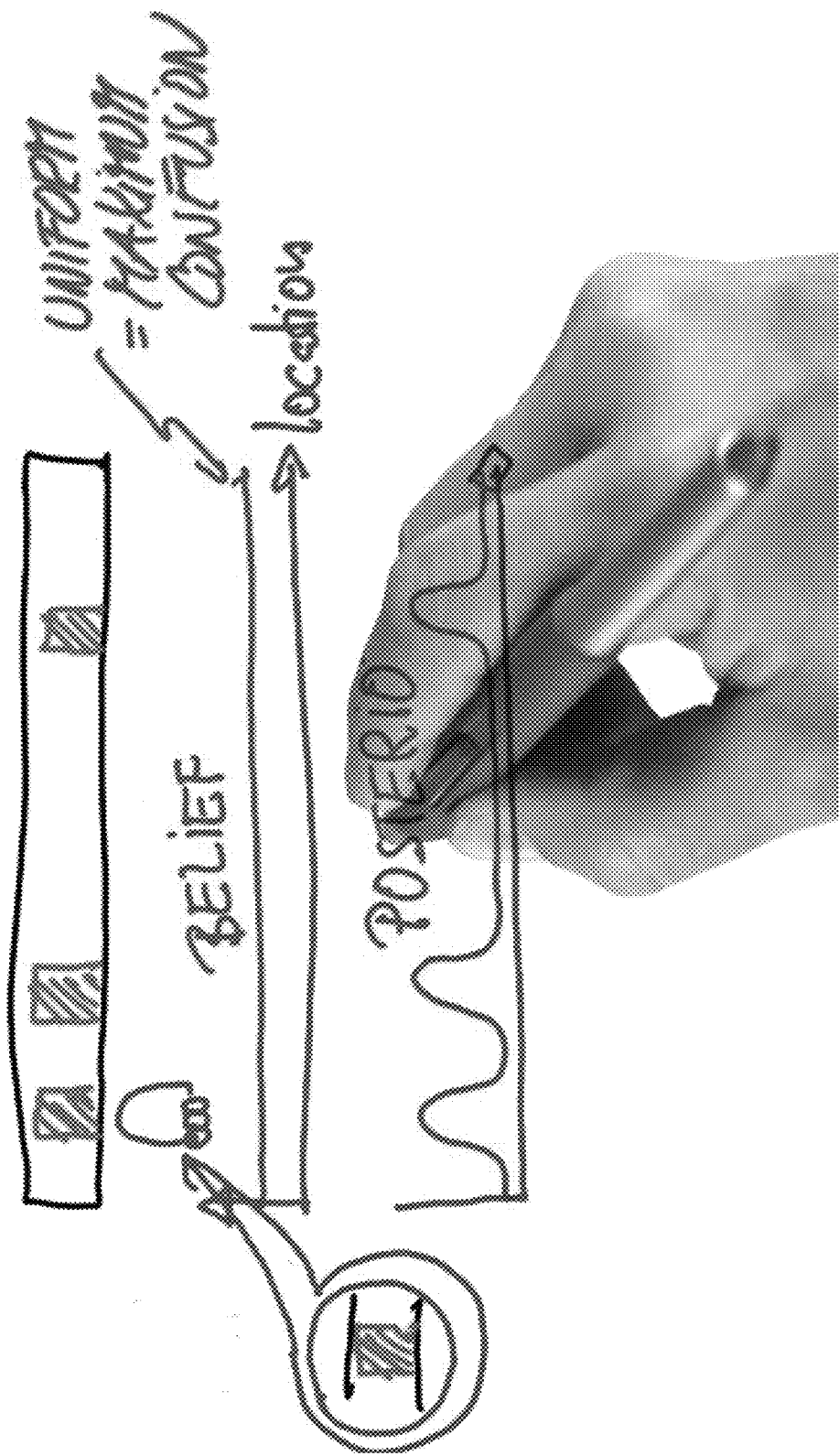

As another example, the audio-visual recording may be "behind in time" compared with the screen capture video, as illustrated in FIG. 9b. In FIG. 9b, the audio-visual recording shows a moment in time t01 where an instructor is writing the letter "s" on tablet touch-sensitive display screen, before the instructor has written the full word "posterio", whereas the superimposed screen capture video shows a moment in time t01 wherein the display screen has already displayed the entire word "posterio".

Thus, the composite video generator is configured to synchronize the screen capture video and the audio-visual recording, before during or after superimposing the screen capture video over the audio-visual recording. For example, the composite video generator can determine a brightness of each of the pixels in a frame of the screen capture video with the brightness of each of the pixels in a frame of the audio-visual recording. If the darker pixels in the screen capture video frame indicate a word has been written, but the darker pixels in the audio-visual frame indicate that the word has not yet been written, then the composite video generator selects a more advanced frame (i.e. later frame) of the screen capture video, and repeats the process, until the markings match (i.e. until the dark pixels of writing in the screen capture video match the dark pixels of writing in the audio-visual recording). The result is a synchronized composite video, and FIG. 7d illustrates an example of a frame of such a synchronized composite video.

According to another aspect, the composite video generator synchronizes an orientation of the screen capture video with orientation of the audio-visual recording, by comparing graphical markings of the screen capture video with graphical markings of the audio-visual recording.

Figure 9C:
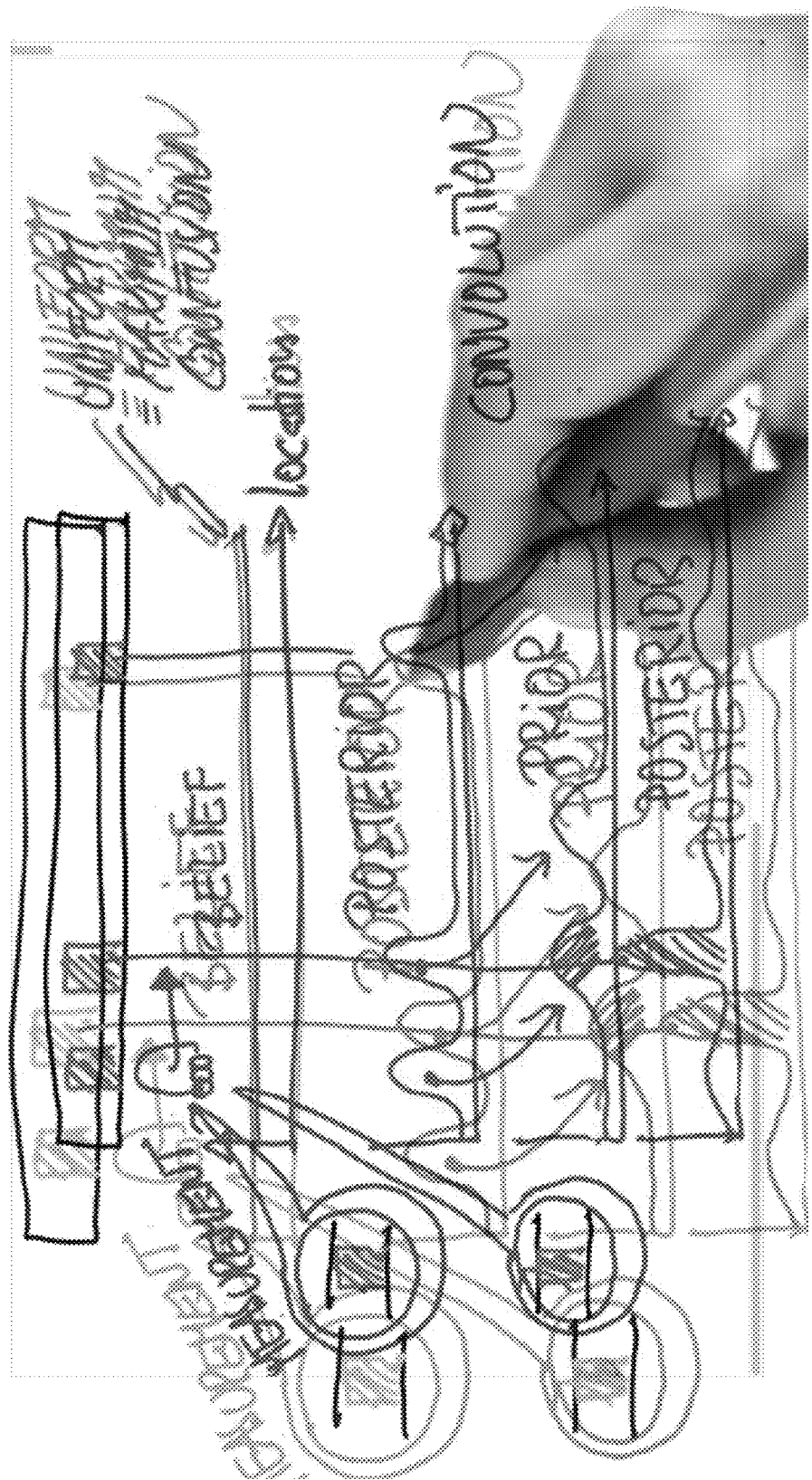

That is, after the composite video generator receives the audio-visual recording from the video camera and the screen capture video from the mobile device, and after the composite video generator processes the opacity of the screen capture video, the composite video generator attempts to superimpose the screen capture video over the audio-visual recording. However, the inputs may not match up exactly, as seen in FIG. 9c.

Thus, the composite video generator is configured to synchronize the screen capture video and the audio-visual recording, before during or after superimposing the screen capture video over the audio-visual recording. For example, the composite video generator can determine a brightness of each of the pixels in a frame of the screen capture video with the brightness of each of the pixels in a frame of the audio-visual recording. If the darker pixels in the screen capture video frame indicate a word has been written, but the darker pixels in the audio-visual frame indicate that the word is at a different location or pixel, then the composite video generator translate, stretches or shrinks the frame of the screen capture video, until the markings match (i.e. until the dark pixels of writing in the screen capture video match the dark pixels of writing in the audio-visual recording). The result is a synchronized composite video, and FIG. 7d illustrates an example of a frame of such a synchronized composite video.

Figure 10:
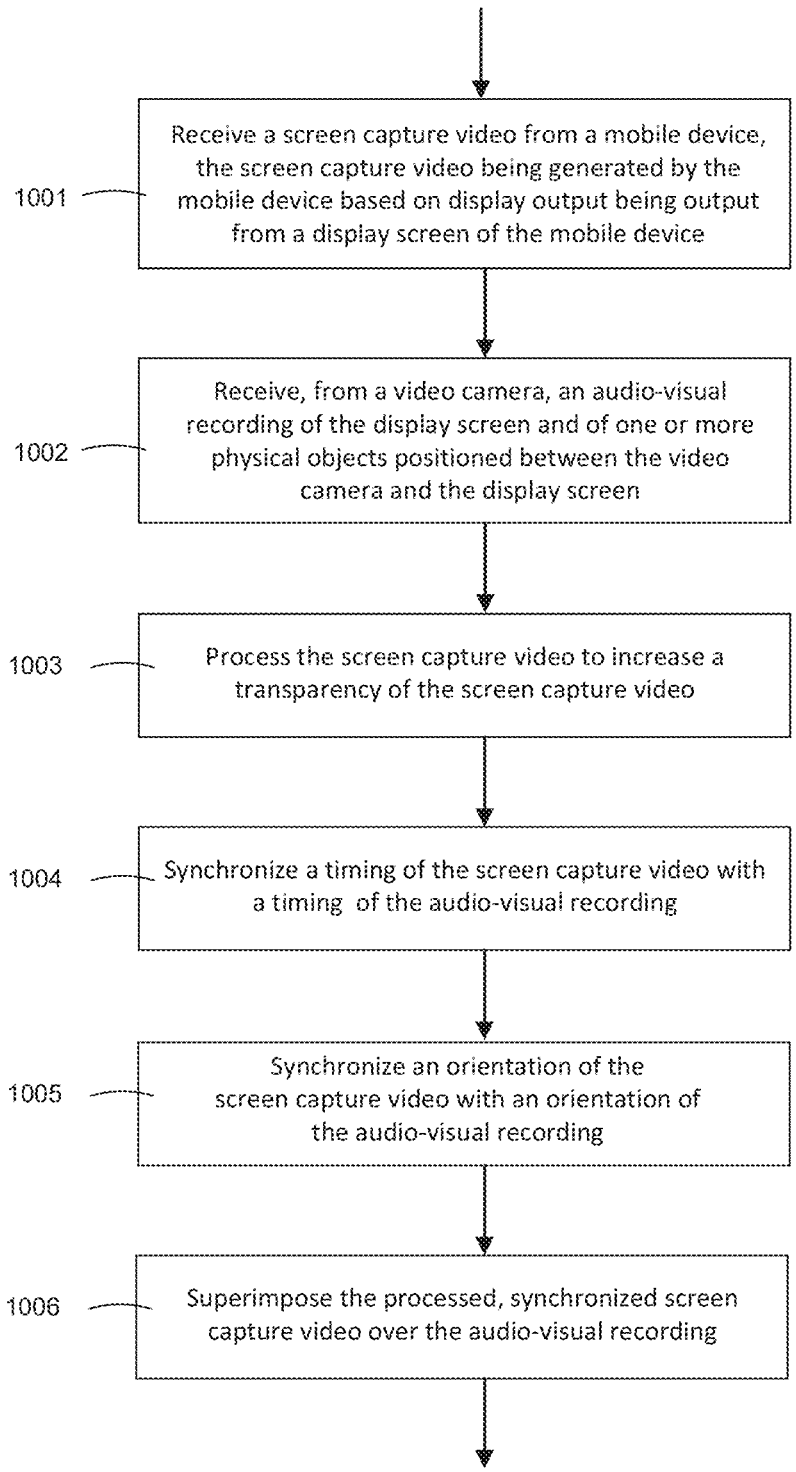
FIG. 10 is a flow chart illustrating a more detailed method of generating a composite lecture video, according to an example embodiment.

FIG. 10 is a flow chart illustrating a method of generating a composite video performed by composite video generator, such as composite video generator 105 or 205, in accordance with an example embodiment. The method may be performed by any of the modules, logic, or components described herein.

In S1001, the composite video generator receives a screen capture video from a mobile device, the screen capture video being generated by the mobile device based on display output being output from a display screen of the mobile device. In S1002, the composite video generator receives, from a video camera, an audio-visual recording of the display screen and of one or more physical objects positioned between the video camera and the display screen. In S1003, the composite video generator processes the screen capture video to increase a transparency of the screen capture video.

Then in S1004, the composite video generator synchronizes a timing of the screen capture video with a timing of the audio-visual recording, by comparing graphical markings of the screen capture video with graphical markings of the audio-visual recording. Thereafter, in S1005, the composite video generator synchronizes an orientation of the screen capture video with an orientation of the audio-visual recording by comparing graphical markings of the screen capture video with graphical markings of the audio-visual recording. Finally, in S1006, the composite video generator superimposes the processed, synchronized screen capture video over the audio-visual recording to generate the composite lecture video.

Figure 11:
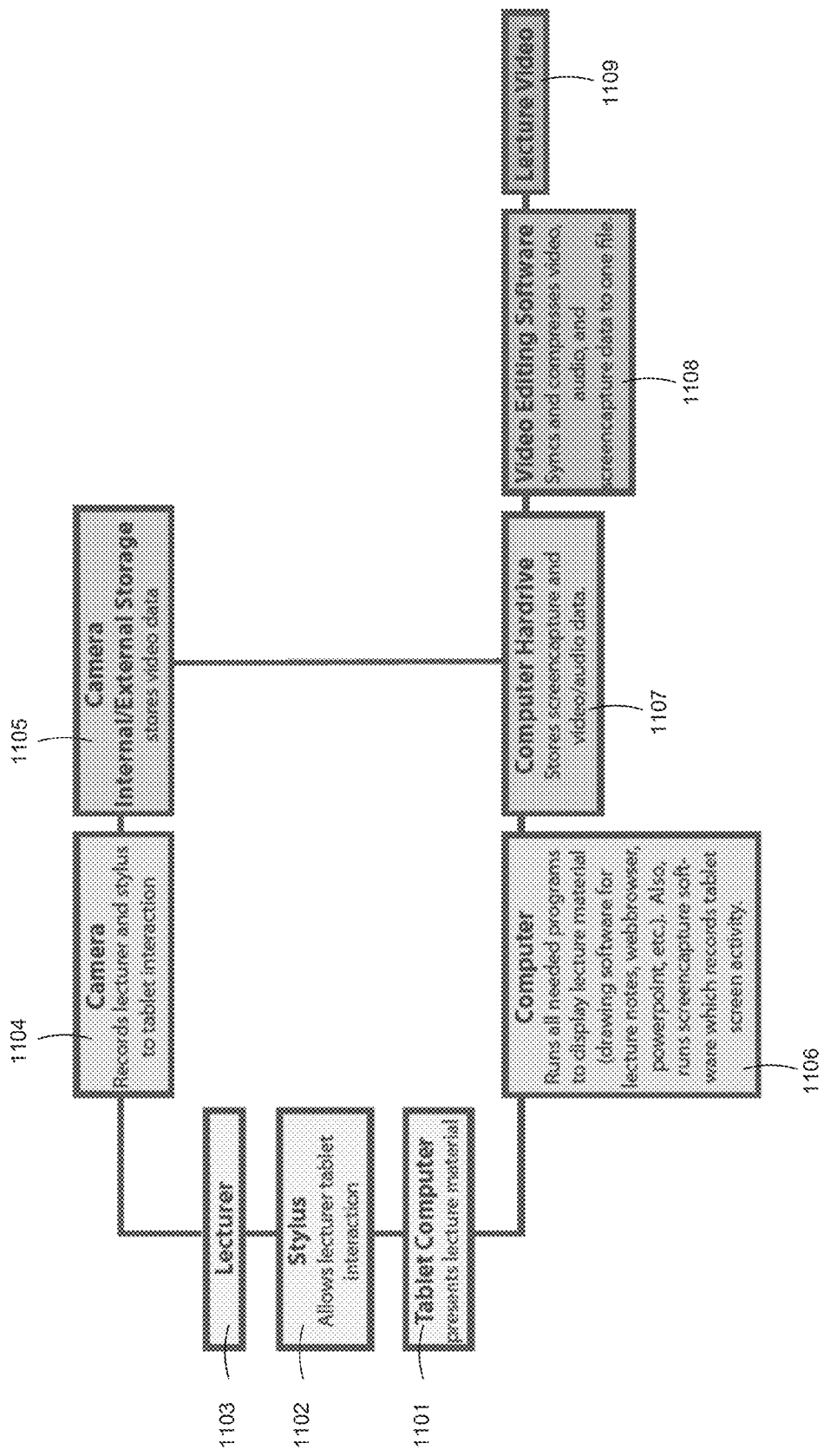
FIG. 11 is a schematic diagram illustrating a process of generating a composite lecture video, according to an example embodiment.

FIG. 11 is a schematic diagram illustrating components of a process of generating a composite lecture video, according to an example embodiment. As seen in FIG. 1, a tablet computer 1101 (which may correspond to mobile device 103 or 203) presents lecture material, and a lecturer 1103 uses a stylus 1102 to point to items displayed on the tablet computer 1101, or to draw/write items on the tablet computer 1101. A camera 1104 records the lecture on the tablet and the stylus interaction with the tablet. The camera's internal/external storage 1105 stores the recorded audio-visual data, and transmits it to a computer hard drive 1107. At the same time, a computer 1106 runs screen capture software to record the screen activity on the screen of the tablet 1101, and the screen capture data is sent to the computer hard drive 1107. The screen capture data and the audio-visual recording are forward to video editing software 1108 that syncs and compresses the audio visual recording and the screen capture data into one file, which then results in the lecture video 1109.

Thus, the embodiments of this disclosure combine tablet-based educational content recording and conventional video-based educational content recordings. Both recording mediums (tablet-based and video-based) have advantages. For example, the tablet generally offers a cleaner presentation and is less prone to lighting or other environmental effects. In addition, the tablet allows for seamless integration of other media types (eg: software coding environments, web sites, multimedia, etc.) On the other hand, the video-based method may feel more personal and engaging for the student, since the teacher's hand can be seen and physical props can be more directly integrated. Aspects of this disclosure combine the advantages of both types of recordings.

As illustrated in FIG. 11, the system uses a computer 1106 (eg: a typical PC or Mac), a computer tablet 1101 (eg: an iPad), and a video camera 1104. The tablet is connected to the computer as an additional monitor. The computer runs all the software needed for lecture material and screen recording. All programs for lecture material are displayed and interacted with on the tablet. The screen recording software at computer 1106 is directed to record all tablet activity. The camera is set up directly above the tablet, with its lens parallel to the tablet display so that it captures the entire screen.

To create a lecture video, the professor will record their lecture material with the tablet, camera, and computer software. For example, the professor writes on the tablet, causes images to be displayed on the tablet, points to things with his/her hand, and can place objects on the tablet. The recorded data is then given to a composite video generator (e.g. video editing software 1108) that will sync and compress each recorded format into one lecture video. Since there are two streams of video content that overlap (the camera and the tablet screen capture), content from one stream or the other can be mixed together in different ways.

Sequence of Frames

Figure 4C:
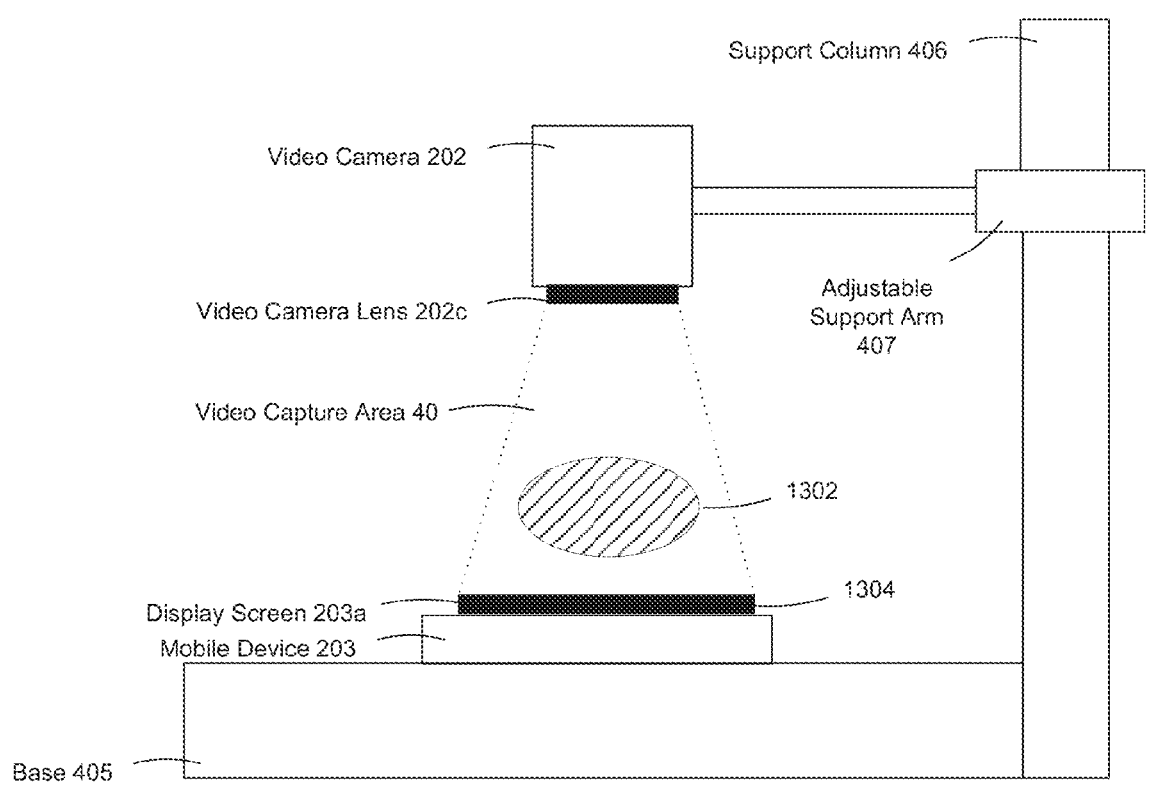

Referring now to FIG. 4C, there is shown the physical arrangement of FIG. 4b with the addition of an object 1302 disposed between the video camera lens 202c and a surface of the display screen 203a so as to obscure a portion of the surface from the viewpoint of the video camera lens 202c. The object may comprise a lecturer's hand and an implement used to produce handmade graphics for display on the surface, for example. The implement may comprise a stylus, a pen or even a person's finger. A video recorded using the video camera 202 will show the object obscuring a portion of the display screen 203a. It will be appreciated that the object is likely to change position in the course of the video, and therefore, at different points in the video created using the video camera, the object may obscure different portions of the display screen 203a from the viewpoint of the video camera lens 202c.

Figure 13A:
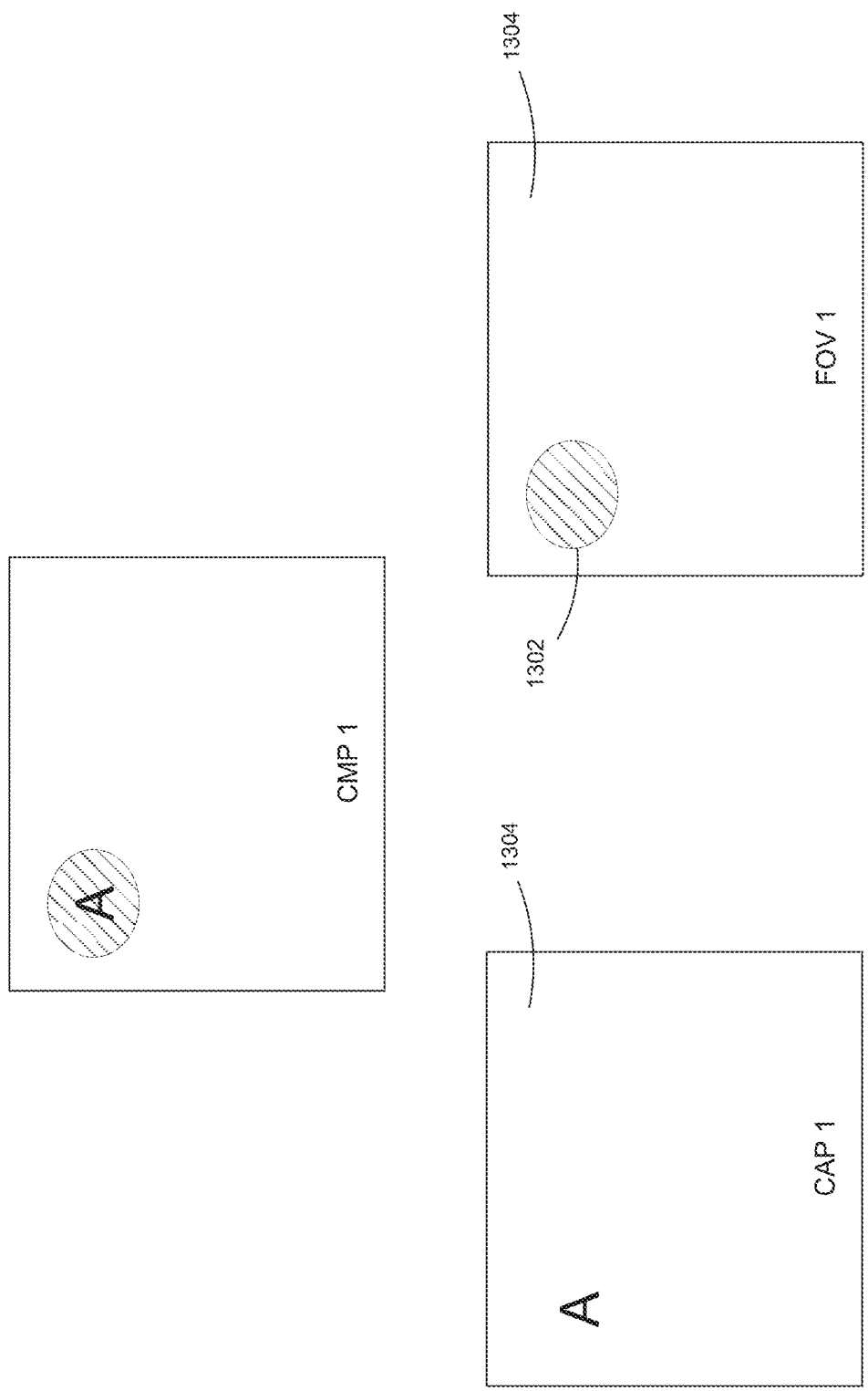
FIGS. 13A-13E are illustrative drawings showing structural relationships among an example sequence of video frames and physical position of an object disposed within a field of view of a video camera, in accordance with some example embodiments.
Figure 13B:
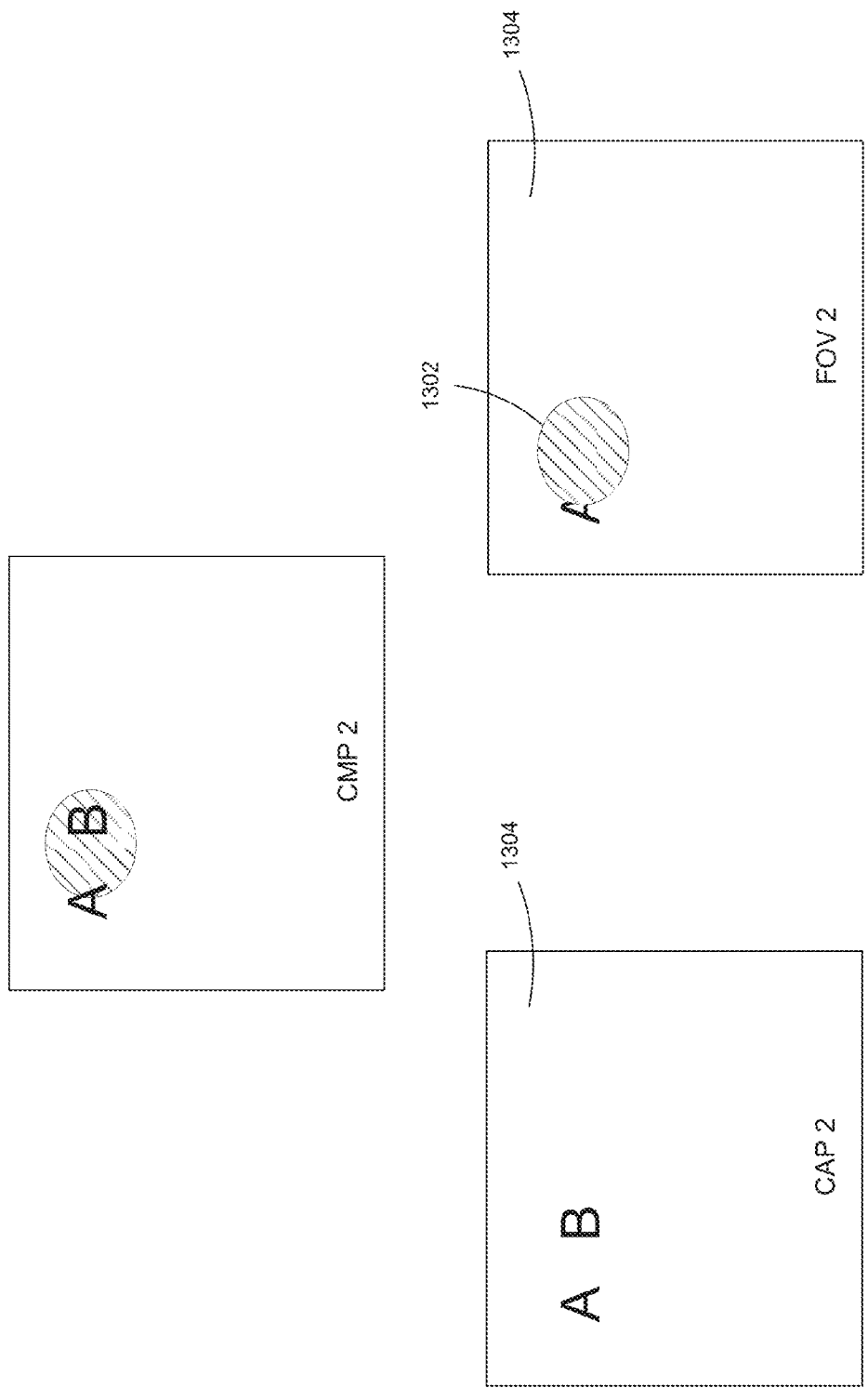
Figure 13C:
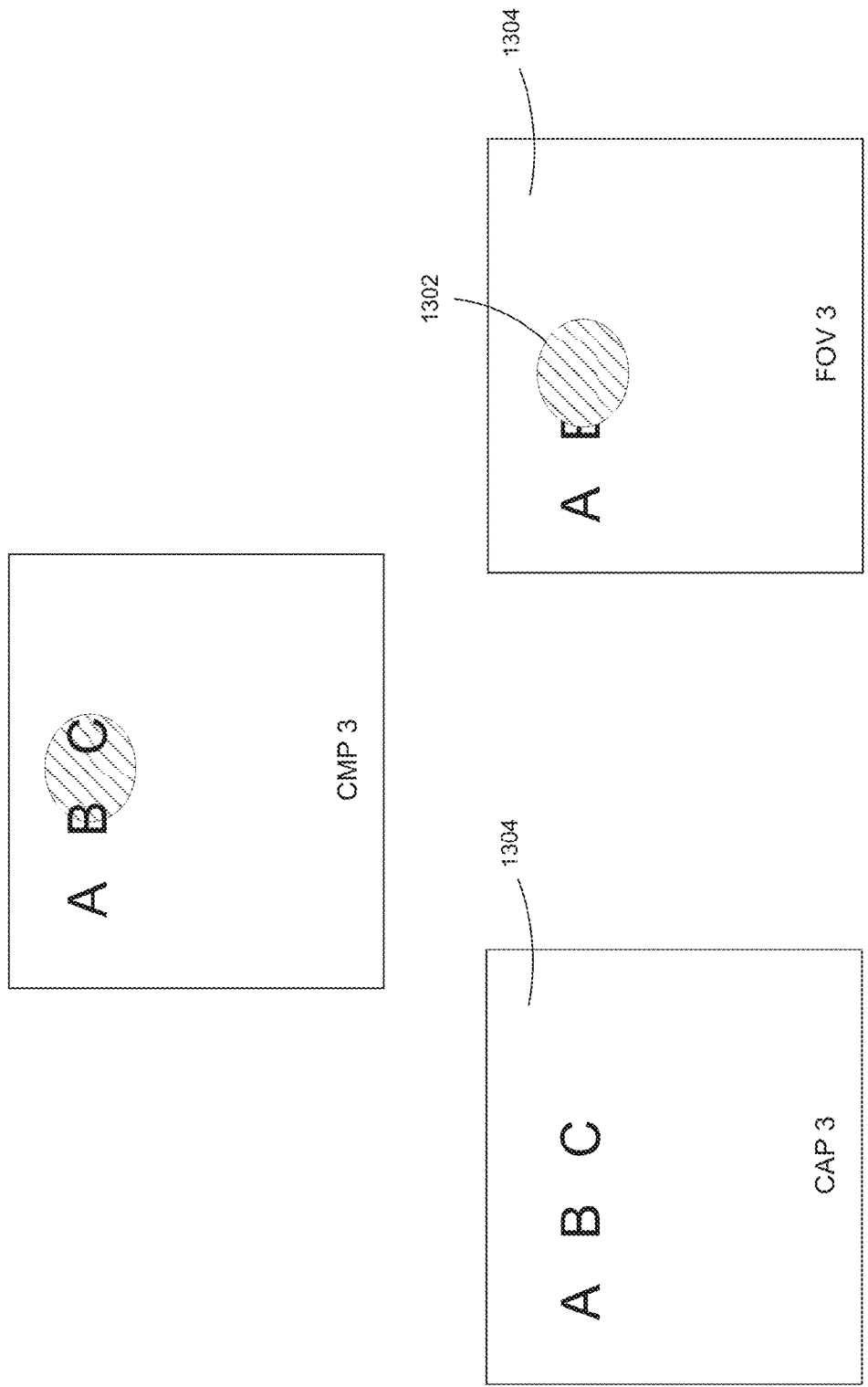
Figure 13D:
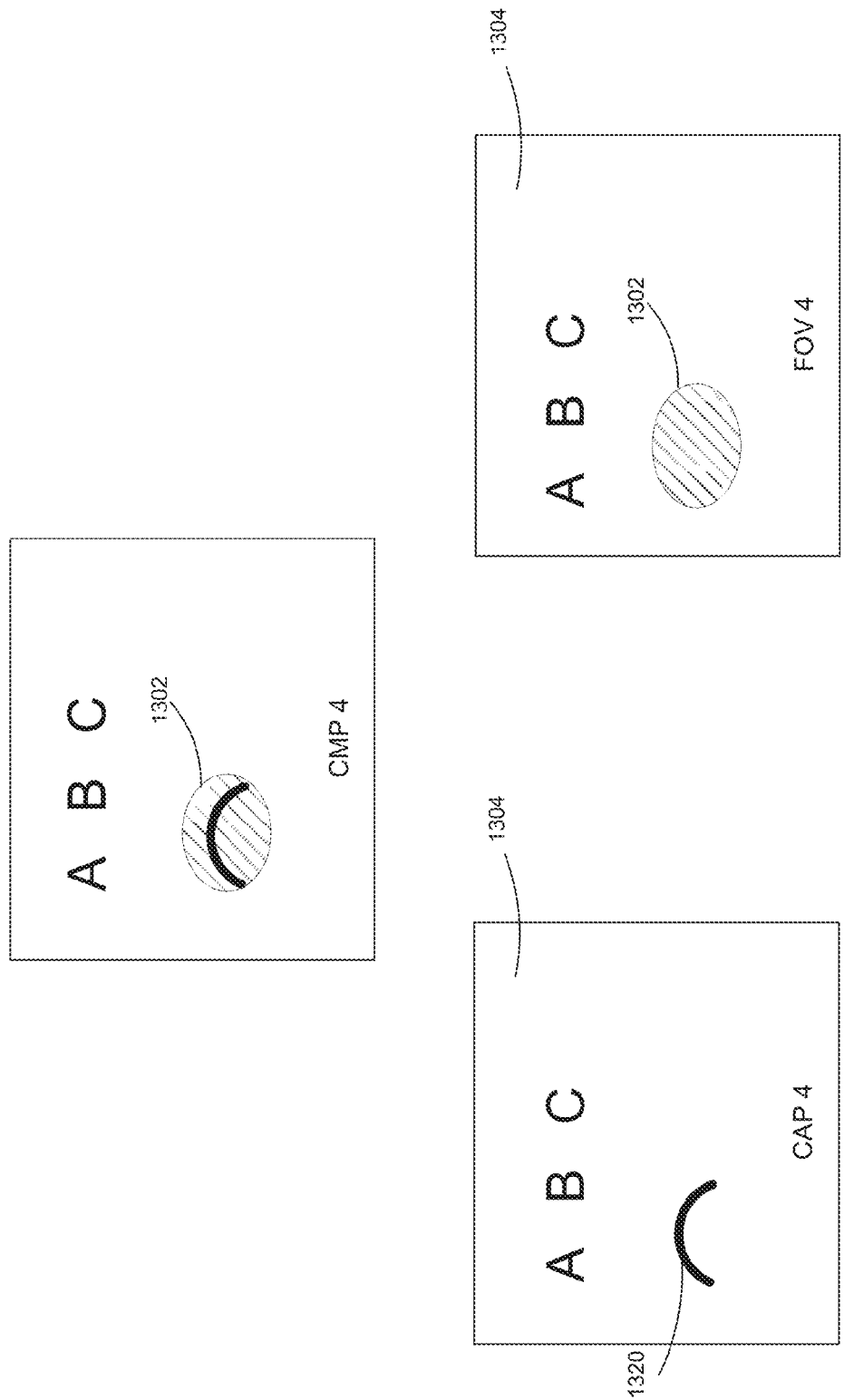
Figure 13E:
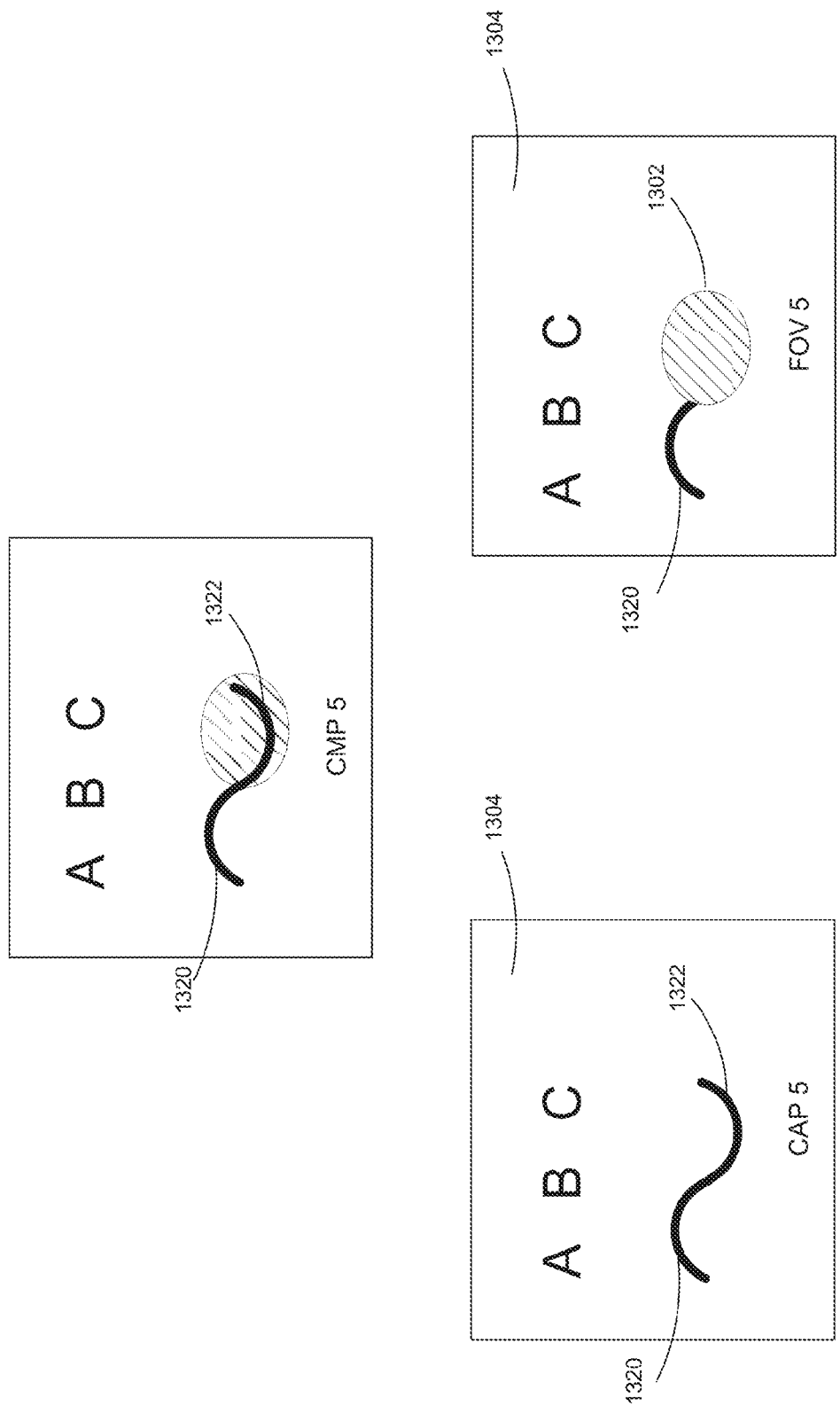

FIGS. 13A-13B are illustrative drawings showing structural relationships among an example sequence of video frames and physical position of the object disposed within a field of view of the video camera lens 202c in accordance with some embodiments. In this illustrative example, assume that a creator of the video reaches his hand while holding a stylus into a first field of view, which in this case is the video capture area 40, in order to create the graphics on a touch sensitive display screen 203a. In this example, the creator's hand and the stylus are represented by and referred to as object 1302. In accordance with some embodiments, the three example video frame sequences shown in FIGS. 13A-13E are produced as a result of the creator's actions. A first sequence of first frames, also referred to herein as a 'field of view' (fov) sequence, comprising frames fov1-fov5 is produced and stored in a machine readable storage device. A second sequence of second frames, also referred to herein as a 'capture' (cap) sequence, comprising frames cap1-cap5 is produced and stored in a machine readable storage device. A third sequence of third frames, also referred to herein as a 'composite' (cmp) sequence, comprising frames cmp1-cmp5 is produced and stored in a machine readable storage device. It will be appreciated that a typical video will include perhaps thousands of frames although only five are shown here for purposes of providing a simplified explanation.

Referring to FIGS. 13A-13E, the camera 202 records the first sequence of first frames fov1-fov5 from a viewpoint of the camera lens 202c as the object 1302 changes location within field of view. Referring to FIG. 4c, each frame of the first sequence encompasses a view of a planar region 1304 within which graphics may be displayed although the object 1302 may obscure a portion of the view from the camera. In some embodiments, the planar region 1304 comprises a surface of a display screen 203a. In some embodiments, graphics are displayed on the display screen 203a using a computing device 203. In some embodiments, the graphics may comprise, for example, handmade notations that are entered by the creator through a touch screen interface and that are displayed on the display screen 203a. In some embodiments, the graphics may comprise, for example, information retrieved from a file that was previously stored in a computer readable device and that is displayed on the display screen 203a. In some embodiments, for example, the graphics may comprise, for example, results of a computer determination such as an analysis, numerical computation, a search of the Internet or a database and that is displayed on the display screen 203a.

Referring again to FIGS. 13A-13E, the computing device 203 records the second sequence of second frames cap1-cap5 by capturing screen displays displayed on display screen 203a. Each frame of the second sequence encompasses a view of a planar region 1304 within which graphics may be displayed. The computing device records the second sequence of second frames simultaneously with the camera 202 recording object 1302 and display screen 203a and graphics displayed by the display screen 203a within the camera's field of view.

Still referring to FIGS. 13A-13E, and also to FIGS. 1-3, generator 105/205 produces composite frames cmp1-cmp5. The generator identifies which graphics or portions of the graphics within the second sequence of frames cap1-cap5 are obscured by the object 1302 in the first sequence of first frames fov1-fov5. In producing the composite sequence, the generator superposes the identified graphics and portions of the graphics from the second frames cap1-cap5 with portions of images of the object 1302 from the first sequence fov1-fov5 that obscure the identified graphics and portions thereof.

By 'superpose' as used herein it is meant, to place one having precedence over another that does not have precedence. In accordance with some embodiments, graphics have precedence over the object. Accordingly, superposing identified graphics with respect to portions of the object that obscure them involves incorporating in the composite frames cmp1-cmp5 graphics from the second frames cap1-cap5 in place of portions of the object in the first frames fov1-fov5 that obscure them.

In determining which graphics or graphics portions are obscured by the object, the generator 105/205 synchronizes the first and second sequences of frames to identify correlated pairs of first and second frames. By 'correlated pair', as used herein, it is meant that the camera 202 recorded the frame in the pair from the first sequence at substantially the same time that the computing device 203 recorded the frame in the pair from the second sequence. The generator identifies graphics from the frame of the second sequence of a correlated pair that are obscured by the object in the frame of the first sequence of the correlated pair. The generator identifies the portion of the object that obscures the identified graphics. The generator superposes the identified graphics with respect to the identified portion of the object within a corresponding composite frame.

Next, the example illustrated in FIGS. 13A-13E is described in detail. In this example, it is assumed that first frame fov1 and the second frame cap1 are a correlated pair. In the second frame cap1, the graphic A is shown displayed in an upper left portion of the view 1304. In the first frame fov1, the object 1302 obscures the graphic A in the upper left portion of the view 1304. Assume, for example that the object 1302 is a creator's hand. He may have been writing the graphic A on the display screen 203a and have temporarily obscured the graphic A while writing it, for example. Alternatively, he may have temporarily obscured the graphic A while drawing viewers' attention the graphic A, for example. Composite frame cmp1 displays the graphic A superposed with respect to a portion of the object that obscured the graphic A. More particularly, the graphic A is displayed in the plane of the planar region 1304 superposed with respect to the portion of the object that obscured the graphic A.

The first frame fov2 and the second frame cap2 are a correlated pair. In the second frame cap2, graphics A and B are displayed. In the first frame fov2, the object 1302 has change position to the right so as to obscure a portion of the graphic A and the entire graphic B. The creator may have been writing the graphic B on the display screen 203a and have temporarily obscured a portion of the graphic A and the entire graphic B while writing the B, for example. Alternatively, he may be drawing viewers' attention the graphic B and have obscured it briefly in the process, for example. Composite frame cmp2 displays a portion of the graphic A and the graphic B superposed with respect to portions of the object that obscured them. The graphics A and B are displayed in the plane of the planar region 1304, and the obscured portions of these graphics are superposed with respect to the portion of the object that obscured them.

The first frame fov3 and the second frame cap3 are a correlated pair. In the second frame cap3, graphics A and B and C are displayed. In the first frame fov3, the object 1302 has change position even further to the right so as to obscure a portion of the graphic B and the entire graphic C. Composite frame cmp3 displays a portion of the graphic B and the graphic C superposed with respect to portions of the object that obscured them. The graphics B and C are displayed in the plane of the planar region 1304, and the obscured portions of these graphics are superposed with respect to the portion of the object that obscured them.

The first frame fov4 and the second frame cap4 are a correlated pair. In the second frame cap4, graphics A and B and C are displayed as well as a first portion 1320 of a handmade notation beneath them and to the left. In the first frame fov4, the object 1302 has changed position down and to the left so as to obscure the portion of a handmade notation. The creator may have entered the notation through a gesture upon a touch screen interface, for example. Composite frame cmp4 displays the handmade notation portion superposed with respect to portions of the object that obscured it. The first handmade notation portion 1320 is displayed in the plane of the planar region 1304, and superposed with respect to the portion of the object that obscured it.

The first frame fov5 and the second frame cap5 are a correlated pair. In the second frame cap5, graphics A and B and C are displayed as well as a completed handmade notation 1320/1322. In the first frame fov5, the object 1302 has changed position to the right so as to obscure a second portion 1322 of the handmade notation 1320/1322. Composite frame cmp5 displays the entire handmade notation with the second portion 1322 superposed with respect to portions of the object that obscured it. The second handmade notation portion 1322 is displayed in the plane of the planar region 1304, and superposed with respect to the portion of the object that obscured it.

Thus, collectively, the composite frames cmp1-cmp5 indicate the sequence of creation of graphics. The sequence of frames also may display removal or erasure of graphics from the planar region 1304. In other words, composite frames not only display the graphics but also display the graphics in the sequence in which they are displayed and/or removed. This is significant since in a lecture, sequencing the presentation of information is important to ensuring that it is understood.

Moreover, collectively, the composite frames cmp1-cmp5 indicate a sequence of activity by a lecturer or a creator of the graphics display. This presence may be manifested through the object 1302 (e.g., the lecturer's hand or finger or pen) temporarily obscuring portions of the planar region 1304 in which graphics are displayed. This intrusion is beneficial since it can have the effect of pacing or sequencing or selectively emphasizing portions of the lecture so as to chunk the information for greater ease of understanding.

The superposing of obscured graphics relative to obscuring portions of the object 1302 has the effect of making all of the graphics available for viewing even as a lecturer calls attention to certain graphics or perhaps creates or removes characters.

Continuing the example, the composite frames cmp1-cmp5 are processed by a computing device to display a sequence of image frames. The image frames constitute a sequence of non-transitory images. The images have tangible existence in the pixel states of the display screen 203a, for example.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
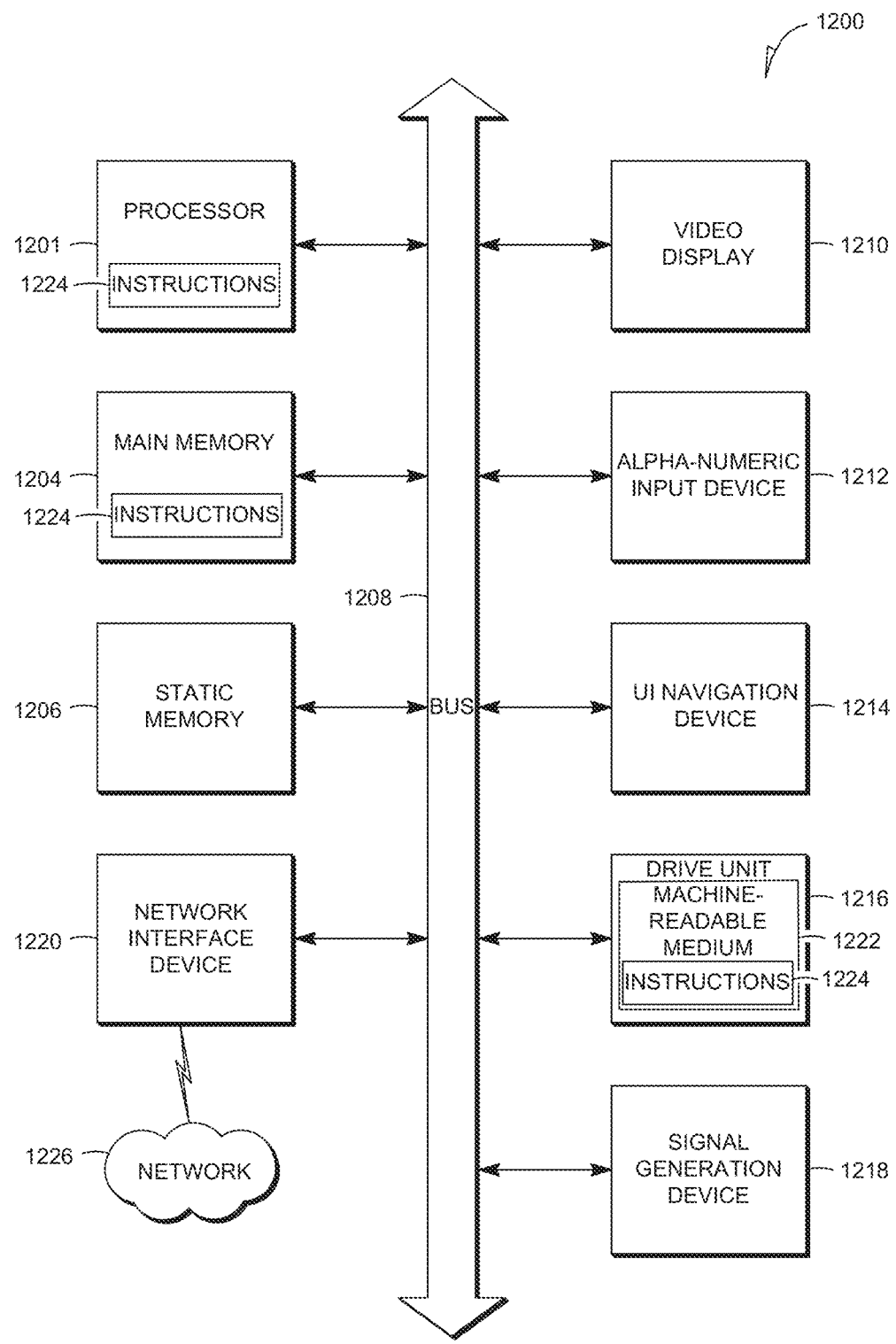
FIG. 12 is a block diagram of machine in the example form of a computer system within which a set instructions, for causing the machine to perform any one or more of the methodologies discussed herein, may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A composite lecture video generation system comprising:
    a mobile device operable to generate a screen capture video, based on display output being output from a display screen of the mobile device, the screen capture video including display output corresponding to graphical markings;

a video camera module operable to generate an audio-visual recording of the display screen, the graphical markings, and one or more physical objects positioned between the video camera and the display screen; and a composite lecture video generator operable to:
process the screen capture video to increase a transparency of one or more white portions of the screen capture video;
synchronize a timing and an orientation of the processed screen capture video with a timing and an orientation of the audio-visual recording, by matching, for each of one or more video frames of the processed screen capture video, the graphical markings included in the corresponding video frame of the processed screen capture video with the graphical markings recorded in a specific video frame of the audio-visual recording; and
superimpose the synchronized processed screen capture video over the synchronized audio-visual recording to generate a composite lecture video, the composite lecture video including the graphical markings included in the screen capture video superimposed over the graphical markings recorded in the audio-visual recording.

2. The composite lecture video generation system of claim 1, wherein the composite lecture video includes the graphical markings included in the screen capture video visually overlapping the physical objects recorded in the audio-visual recording.

3. The composite lecture video generation system of claim 1, wherein the one or more physical objects include a stylus.

4. A composite lecture video generator comprising:
a mobile device interface module operable to receive a screen capture video from a mobile device, the screen capture video being generated by the mobile device based on display output being output from a display screen of the mobile device, the screen capture video including display output corresponding to graphical markings;
a video camera interface module operable to receive, from a video camera, an audio-visual recording of the display screen, the graphical markings, and one or more physical objects positioned between the video camera and the display screen; and
a processing module operable to:
process the screen capture video to increase a transparency of one or more white portions of the screen capture video;
synchronize a timing and an orientation of the processed screen capture video with a timing and an orientation of the audio-visual recording, by matching, for each of one or more video frames of the processed screen capture video, the graphical markings included in the corresponding video frame of the processed screen capture video with the graphical markings recorded in a specific video frame of the audio-visual recording; and
superimpose the synchronized processed screen capture video over the synchronized audio-visual recording to generate a composite lecture, the composite lecture video including the graphical markings included in the screen capture video superimposed over the graphical markings recorded in the audio-visual recording.

5. The composite lecture video generator of claim 4, wherein the composite lecture video includes the graphical markings included in the screen capture video visually overlapping the physical objects recorded in the audio-visual recording.

6. The composite lecture video generator of claim 4, wherein the one or more physical objects include a stylus.

7. A method for generating a composite lecture video, the method comprising:
receiving a screen capture video from a mobile device, the screen capture video being generated by the mobile device based on display output being output from a display screen of the mobile device, the screen capture video including display output corresponding to graphical markings;
receiving, from a video camera, an audio-visual recording of the display screen, the graphical markings, and one or more physical objects positioned between the video camera and the display screen;
processing the screen capture video to increase a transparency of one or more white portions of the screen capture video;
synchronizing a timing and an orientation of the processed screen capture video with a timing and an orientation of the audio-visual recording, by matching, for each of one or more video frames of the processed screen capture video, the graphical markings included in the corresponding video frame of the processed screen capture video with the graphical markings recorded in a specific video frame of the audio-visual recording; and
superimposing the synchronized processed screen capture video over the synchronized audio-visual recording to generate a composite lecture, the composite lecture video including the graphical markings included in the screen capture video superimposed over the graphical markings recorded in the audio-visual recording.

8. The method of claim 7, wherein the composite lecture video includes the graphical markings included in the screen capture video visually overlapping the physical objects recorded in the audio-visual recording.

9. An article of manufacture including a non-transitory machine readable storage device that stores a data structure produced using a process comprising:
producing a first sequence of first frames that each encompass a view of a planar region;
wherein producing the first frames includes recording within the first sequence of first frames a displaying of graphics within the planar region as the graphics are displayed from a viewpoint in which an object is disposed between the viewpoint and the planar region so as to obscure at least a portion of the displayed graphics;
producing a second sequence of second frames that each encompass a view of the graphics within the planar region;
wherein producing the second frames includes recording within the second sequence of second frames the displaying of graphics within the planar region;
processing the second sequence of second frames to increase a transparency of one or more white portions of the second sequence of second frames;
synchronizing the first and second sequences of frames to identify correlated pairs of first and second frames, by matching, for each of one or more video frames of the first sequence of first frames, the graphics included in the corresponding video frame of the first sequence of first frames with the graphics recorded in a specific video frame of the second sequence of second frames; and superposing the graphics or portions thereof shown in the processed second sequence of second frames with respect to portions of the object shown in the first sequence of first frames that obscure such graphics or portions thereof.

10. The article of manufacture of claim 9,
wherein producing the first and second sequences of frames includes recording, collectively within the sequences, creation of the graphics within the region.

11. The article of manufacture of claim 9,
wherein producing the first sequence of frames includes recording, within the first sequence, use of the object in creation of the graphics within the region.

12. The article of manufacture of claim 9,
wherein producing the first sequence of frames includes recording, within the first sequence, movement of the object relative to the planar region to impart instructions to a computer system to display graphics that correspond to the movement.

13. The article of manufacture of claim 9,
wherein the displaying of graphics involves a computer system displaying graphics in response to movement of the object relative to the planar region to impart instructions to the computer system.

14. The article of manufacture of claim 9,
wherein the displaying of graphics involves a computer system generating images corresponding to information stored previously in a machine readable storage device.

15. The article of manufacture of claim 9,
wherein the displaying of graphics involves a computer system determining results and generating images corresponding to the results.

16. The article of manufacture of claim 9,
wherein the displaying of graphics involves a computer system displaying graphics in response to movement of the object relative to the planar region to impart instructions to the computer system; and
wherein the graphics comprise handmade notations using the object.

17. The article of manufacture of claim 9,
wherein the displaying of graphics involves a computer system generating images corresponding to information stored previously in a machine readable storage device; and
wherein the graphics comprise text.

18. The article of manufacture of claim 9,
wherein the displaying of graphics involves a computer system displaying graphics in response to movement of the object relative to the planar region to impart instructions to the computer system; and
wherein the displaying of graphics further involves a computer system generating images corresponding to information stored previously in a machine readable storage device.

19. The article of manufacture of claim 9,
wherein the displaying of graphics involves a computer system displaying graphics in response to movement of the object relative to the planar region to impart instructions to the computer system; and
wherein the displaying of graphics further involves a computer system determining results and generating images corresponding to the results.

20. The article of manufacture of claim 9,
wherein superposing further includes:
superposing the graphics or portions thereof shown in respective second frames in respective correlated frames with respect to portions of the object shown in respective first frames in the respective correlated frames that obscure such graphics or portions thereof.

21. The article of claim 9,
wherein the frames are video frames.

22. The article of claim 9,
wherein the planar region comprises a physical surface.

23. An article of manufacture including a non-transitory machine readable storage device comprising instructions that, when executed by one or more processors of a machine, cause the machine to perform operations comprising:
generating a sequence of frames that each encompasses a view of a planar region and that show graphics displayed within the region from a viewpoint in which an object is shown disposed between the viewpoint and the region and in which images of the graphics or portions thereof are shown superposed with respect to portions of the object that otherwise would obscure such graphics or portions thereof;
processing the images of the graphics or portions thereof to increase a transparency of one or more white portions of the images; and
synchronizing a timing and an orientation of the images with a timing and an orientation of the sequence of frames, by matching, for each of one or more video frames associated with the images, the graphics or portions thereof included in the corresponding video frame associated with the images with the graphics recorded in a specific video frame of the sequence of frames.

24. The article of manufacture of claim 23,
wherein the sequence of frames collectively show sequence of creation of the graphics within the region.

25. The article of manufacture of claim 23,
wherein the sequence of frames collectively show relationship oft the object to creation of the graphics within the region.

26. The article of manufacture of claim 23,
wherein the sequence of frames collectively show relationship of movement of the object relative to the planar region to imparting instructions to a computer system to display graphics that correspond to the movement.

27. The article of manufacture of claim 23,
wherein the displaying of graphics involves a computer system generating images.

28. The article of claim 23,
wherein the frames comprise video frames.

29. The article of claim 23,
wherein the planar region comprises a physical surface.

30. An electronic display device comprising:
one or more processors configured to display a sequence of image frames that each encompasses a view of a planar region and that show graphics displayed within the region from a viewpoint in which an object is shown disposed between the viewpoint and the region and in which images of the graphics or portions thereof are shown superposed with respect to portions of the object that otherwise would obscure such graphics or portions thereof,
wherein the images of the graphics or portions thereof are processed to increase a transparency of one or more white portions of the images, and
wherein a timing and an orientation of the images is synchronized with a timing and an orientation of the sequence of image frames, by matching, for each of one or more video frames associated with the images, the graphics or portions thereof included in the corresponding video frame associated with the images with the graphics recorded in a specific video frame of the sequence of image frames.

31. The display device of claim 30, wherein the sequence of frames collectively show sequence of creation of the graphics within the region.

32. The display device of claim 30, wherein the sequence of frames collectively show relationship of the object to creation of the graphics within the region.

33. The display device of claim 30, wherein the sequence of frames collectively show relationship of movement of the object relative to the planar region to imparting instructions to a computer system to display graphics that correspond to the movement.

34. The display device of claim 30, wherein the displaying of graphics involves a computer system generating images.

35. The display device of claim 30, wherein the image frames comprise video frames.

36. The display device of claim 30, wherein the planar region comprises a physical surface.

* * * * *